United States Patent
Enomoto

(10) Patent No.: US 7,357,242 B2
(45) Date of Patent: Apr. 15, 2008

(54) TRANSFER APPARATUS

(75) Inventor: Masahiro Enomoto, Shiga (JP)

(73) Assignee: Daifuku Co., Ltd. (JP)

( * ) Notice: Subject to any disclaimer, the term of this patent is extended or adjusted under 35 U.S.C. 154(b) by 179 days.

(21) Appl. No.: 10/902,549

(22) Filed: Jul. 29, 2004

(65) Prior Publication Data

US 2005/0029077 A1    Feb. 10, 2005

(30) Foreign Application Priority Data

Aug. 5, 2003    (JP) ............................ 2003-286341

(51) Int. Cl.
*B65G 47/46*    (2006.01)

(52) U.S. Cl. ..................... 198/370.02; 198/370.01; 198/456; 198/457.01; 198/458; 198/618; 198/890; 198/890.1

(58) Field of Classification Search .......... 198/370.01, 198/370.02, 456, 457.01, 458, 618, 890, 198/890.1

See application file for complete search history.

(56) References Cited

U.S. PATENT DOCUMENTS

| | | | | |
|---|---|---|---|---|
| 4,711,341 A | * | 12/1987 | Yu et al. ............... | 198/370.02 |
| 4,717,011 A | * | 1/1988 | Yu et al. ............... | 198/370.02 |
| 4,971,190 A | * | 11/1990 | Berends et al. ........ | 198/370.02 |
| 5,027,939 A | * | 7/1991 | Kilper et al. ............ | 198/890 |
| 5,048,665 A | * | 9/1991 | Vickers .................... | 198/350 |
| 5,131,522 A | * | 7/1992 | Fujio ..................... | 198/370.02 |
| 5,613,591 A | * | 3/1997 | Heit et al. ............. | 198/370.02 |

FOREIGN PATENT DOCUMENTS

| | | |
|---|---|---|
| JP | 04-223921 | 8/1992 |
| JP | 06-336333 | 6/1994 |
| JP | 09/052621 | 2/1997 |
| JP | 11-157641 | 6/1999 |
| JP | 2001-301957 | 10/2001 |
| JP | 2002-002949 | 1/2002 |

* cited by examiner

*Primary Examiner*—Gene O. Crawford
*Assistant Examiner*—Leslie A Nicholson, III
(74) *Attorney, Agent, or Firm*—Kusner & Jaffe

(57) ABSTRACT

A transfer apparatus includes an electrical extension and contraction drive device which is connected to a distribution guide body, so that the switching action of the distribution guide body can be performed at a high speed, with shortened response time. Hence, the apparatus can respond suitably to increase in speed of the conveyance and branching operations. Further, since only electrical power supply wires and signal wires are required as peripheral elements, distributing means can be constituted in a compact fashion.

10 Claims, 26 Drawing Sheets

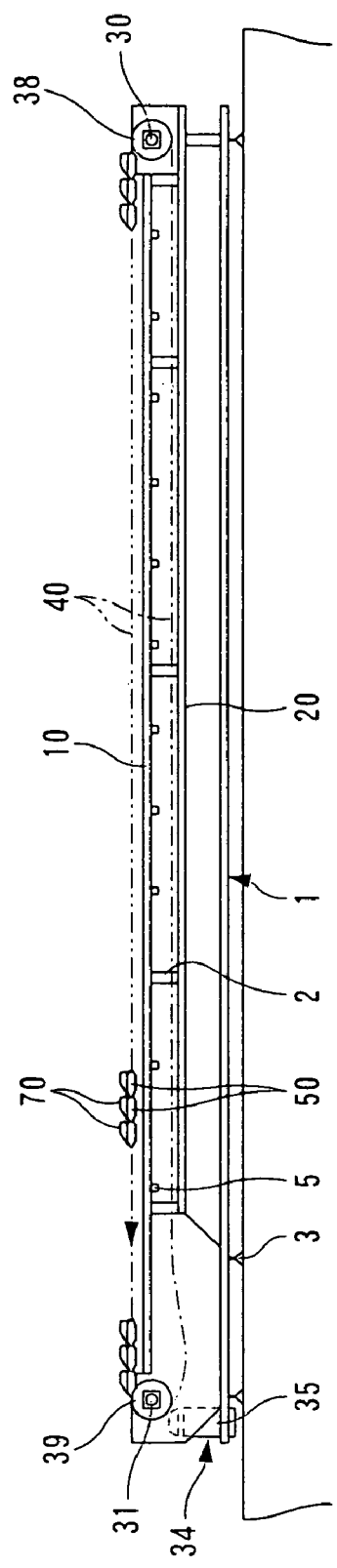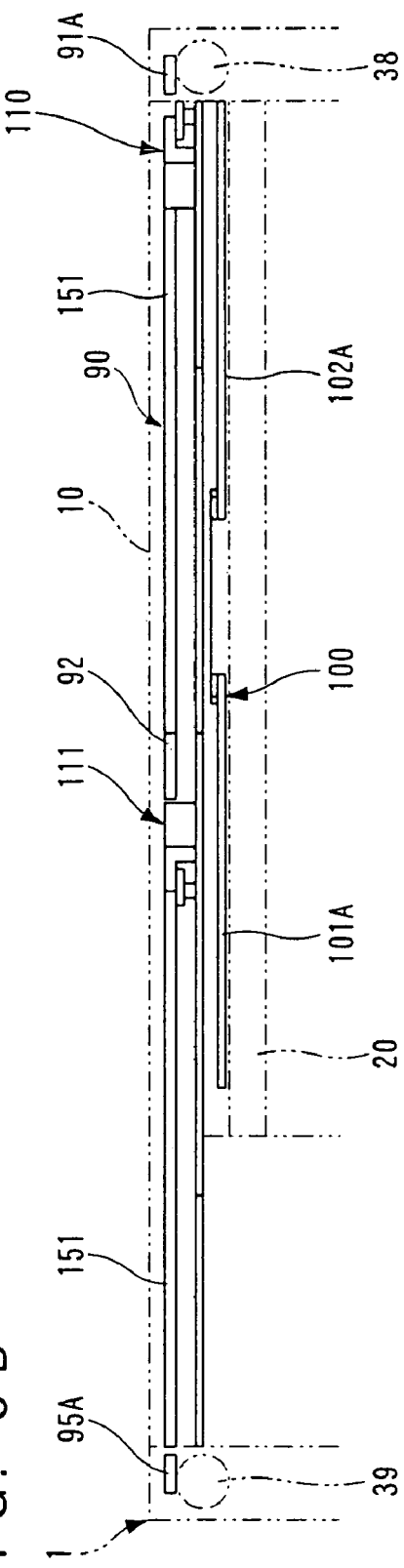
F I G. 3 A
F I G. 3 B

TRANSFER APPARATUS

FIELD OF THE INVENTION

The present invention relates to a transfer apparatus used for transferring articles conveyed on a main conveyance path, for example, onto a branching conveyance path provided externally to the side portion of this main conveyance path.

BACKGROUND OF THE INVENTION

In the prior art, as an apparatus of this kind, a slat conveyor as disclosed in Japanese Unexamined Patent Publication No. 11-157641 is provided, for example. In this conventional composition, a plurality of slats are provided between a pair of right and left chains, and guided members (pin and guide rollers) are provided on the rear face of pressing chains which are guided by these slats. A group of guide bodies for guiding the guided members and diagonally acting switching means disposed on a branching section of this group of guide bodes. The diagonally acting switching means is constituted in such a manner that it causes a diagonally action transfer tool to operate in the lateral direction of the conveyor by means of a diagonal action air cylinder, pins being guided by guide faces formed on the diagonal action transfer tool, in such a manner that they are directed by a main guide and a diagonal action branching guide.

However, according to the conventional composition described above, since the composition is such that a diagonal action transfer tool is connected directly to the piston rod of a diagonal action air cylinder, then it is necessary to provide a valve and air piping in order to operate the switching of the diagonal action air cylinder, the section of the diagonal action switching means becomes complicated, and furthermore, it increases in size. Moreover, since the system is activated by means of the flow of air created by switching a valve, there are limitations on the degree to which the response time can be shortened.

Furthermore, according to the prior art composition described above, since the composition is such that a diagonal transfer tool is connected directly to the piston rod of a diagonal action air cylinder, noise is generated when the diagonal transfer tool is operated in the lateral direction of the conveyor, by means of the diagonal action air cylinder, in other words, when the diagonal action transfer tool is operated in the lateral direction of the conveyor. On the other hand, this can be resolved by providing rubber cushions on a positioning member which confronts the diagonal action transfer tool. However, if the conveyance and branching is to be carried out at high speed, then it becomes necessary to provide a large number of rubber cushions, in accordance with the high-speed switching of the diagonal action transfer tool, and consequently, the position of the diagonal action transfer tool becomes irregular, depending on the amount of deformation of the rubber cushion, and hence a step difference arises between the guide surfaces and smooth guiding of the guided members is not possible.

SUMMARY OF THE INVENTION

One advantage of the present invention is a transfer apparatus whereby distributing means can be constituted in a compact manner while shortening the response time, and furthermore, in such a manner that the distributing means is able to operate reliably at all times without receiving the affects of external disturbances.

Furthermore, the present invention also provides a transfer apparatus whereby the switching operation of distributing means can be carried out smoothly and reliably at all times, while reducing noise generation.

In order to achieve the aforementioned objects, the transfer apparatus according to the present invention is a transfer apparatus comprising: a pair of right and left endless rotating bodies disposed along a main conveyance path; article supporting bodies having a longitudinal direction which is perpendicular to the main conveyance path, and installed in plural fashion between the endless rotating bodies; article lateral pushing bodies guided by the article supporting bodies; guided bodies provided on the rear face of the article lateral pushing bodies; a group of guide devices for guiding the guided bodies; and distributing means disposed at a branching section of the group of guide devices, wherein the distributing means comprises a distribution guide body capable of swinging about a vertical axis, and an electrical extension and contraction drive device connected to a distribution guide body.

According to the aforementioned composition of the present invention, it is possible to convey articles supplied to a start section of a main conveyance path, towards the end section thereof, by causing the group of article supporting bodies to move by moving the endless rotating bodies. The guided bodies on the article lateral pushing bodies, which move in unison with the article supporting bodies, can be guided by the group of guide devices. In this case, the distribution guide body of the distributing means provided at the branching section of the guide device can be set to either a non-distributing position or a distributing position, by causing the distribution guide body to swing about the vertical axis by extending or contracting the electrical extension and contraction drive device.

Therefore, by setting the distribution guide body to a non-distributing position, the guided body can be made to move straight through the region of the distributing means, without being distributed. Furthermore, by setting the distribution guide body to a distributing position, it is possible to guide and distribute a desired guided body, by means of the distribution guide body, and hence the article lateral pushing body imparts a lateral pushing action to the article, in a perpendicular fashion to the main conveyance path, while moving in the conveyance direction, and the article can thus be pushed to one side, from the main conveyance path, without altering the orientation thereof.

In this case, the switching action of the distribution guide body can be performed at high speed and with shortened response time, by adopting an electrical extension and contraction drive device, and hence satisfactory response to increased speed of the conveyance and branching operations can be achieved. Moreover, by adopting an electrical extension and contraction drive device, only electrical power supply wires and signal wires are required as peripheral elements, and therefore the distributing means can be composed in a compact fashion, in addition to which the distributing operation can be carried out in a smooth and reliable fashion at all times, without being affected by external disturbances.

In a first preferred mode of the transfer apparatus according to the present invention, the electrical extension and contraction drive device is a linear motor type, wherein a linearly moving rod is coupled in a relatively swingable fashion to the distribution guide body by means of a vertical pin.

According to this first mode, it is possible to cause the rod to perform an extending action or a contracting action in a linear direction, by causing current to flow in one direction or another direction (opposite direction) in the coil of the linear motor section, and hence a reliable extending movement can be achieved by means of a simple control procedure.

In a second preferred mode of the transfer apparatus according to the present invention, swing amount controlling means against which the distribution guide body can abut is provided on a fixed section therefor.

According to this second mode of the invention, it is possible to position the distribution guide body in a non-distributing attitude or a distributing attitude, by causing the distribution guide body to abut against the swing amount controlling means.

In a third preferred embodiment of the transfer apparatus according to the present invention, the swing amount controlling means comprises a first stopper body having soft elastic properties, and a second stopper body having hard elastic properties. And the distribution guide body abuts against the first stopper body and subsequently abuts against the second stopper body while causing the first stopper body to undergo elastic deformation.

According to this third mode of the invention, the controlling action performed by the swing amount controlling means first slows the switching movement while eliminating noise (reducing the generation of noise), by means of the elastic deformation of the first stopper body which has soft elastic properties, and then it is able to maintain the distribution guide body in a prescribed position in the inward/outward direction, without causing the same to bounce, by means of elastic deformation of the second stopper body which has hard elastic properties.

The transfer apparatus according to the present invention is a transfer apparatus comprising: a pair of right and left endless rotating bodies disposed along a main conveyance path; article supporting bodies having a longitudinal direction which is perpendicular to the main conveyance path, and installed in plural fashion between the endless rotating bodies; article lateral pushing bodies guided by the article supporting bodies; guided bodies provided on the rear face of the article lateral pushing bodies; a group of guide devices for guiding the guided bodies; and distributing means disposed at a branching section of the group of guide devices, wherein the distributing means comprises a distribution guide body capable of swinging about a first vertical axis, and an operating body capable of swinging about a second vertical axis, the distribution guide body and the operating body being coupled in a relatively rotatable fashion by means of a relative coupling section, and the operating body being operatively connected with a swinging device.

According to the aforementioned composition of the present invention, it is possible to convey articles supplied to a start section of a main conveyance path, towards the end section thereof, by causing the group of article supporting bodies to move by moving the endless rotating bodies. The guided bodies on the article lateral pushing bodies, which move in unison with the article supporting bodies, can be guided by the group of guide devices. In this case, the distribution guide body of the distributing means provided at the branching section of the guide device can be set to either a non-distributing position or a distributing position, by causing the operating body to swing about the second vertical axis, by operating the swinging device, transmitting the swinging movement of the operating body to the distribution guide body, by means of the relative coupling section, and thus causing the distribution guide body to swing about the first vertical axis.

Therefore, by setting the distribution guide body to a non-distributing position, the guided body can be made to move straight through the region of the distributing means, without being distributed. Furthermore, by setting the distribution guide body to a distributing position, it is possible to guide and distribute a desired guided body, by means of the distribution guide body, and hence the article lateral pushing body imparts a lateral pushing action to the article, in a perpendicular fashion to the main conveyance path, while moving in the conveyance direction, and the article can thus be pushed to one side, from the main conveyance path, without altering the orientation thereof.

In this case, the operating body performs the role of a shock absorbing body, since it is interposed between the distribution guide body and the swinging device, and therefore, the switching action of the distributing means can be carried out smoothly and reliably at all times, while reducing noise generation, and furthermore, it can respond satisfactorily to increases in the speed of the conveyance and branching operations.

In a first preferred mode of the transfer apparatus according to the present invention, the relative coupling section is constituted by a long hole section formed in either one of the distribution guide body or the operating body, and a vertical pin formed in the other thereof.

According to this first mode of the invention, when the distributing means performs a distributing action, the vertical pin moves with respect to the long hole section, whereby any positional divergence at the time of the switching operation can be absorbed in the longitudinal direction of the long hole section, and hence no step differences occur between the guide faces, thus allowing the guided body to be guided in a smooth fashion.

In a second preferred mode of the transfer apparatus according to the present invention, swing amount controlling means against which the operating body can abut is provided on a fixed section therefor.

According to this second mode of the invention, it is possible to position the distribution guide body in a non-distributing attitude or a distributing attitude, by causing the operating body to abut against the swing amount controlling means.

In a third mode of the transfer apparatus according to the present invention, the end section of the distribution guide body and the start section of a distribution director body overlap mutually in the vertical direction, in such a manner that the distribution guide faces of the distribution guide body and the distribution director body are connected in a continuous fashion.

According to this third mode of the invention, the guided body arrives, simultaneously, at the distribution guide face at the end section of the distribution guide body and the distribution guide face at the start section of the distribution director body, and hence the movement of the guided body from the distribution guide body to the distribution director body can always be carried out in a smooth and reliable fashion.

In a fourth preferred mode of the transfer apparatus according to the present invention, the position at which the swinging device is connected to the operating body is on the side of the relative coupling section, with respect to the second vertical axis.

According to this fourth mode of the invention, it is possible to compose the whole of the distributing means, including the swinging device, in a compact fashion.

In a fifth preferred mode of a transfer apparatus according to the present invention, the position at which the swinging device is connected to the operating body is on the opposite side to the relative coupling section, with respect to the second vertical axis.

According to this fifth mode of the invention, it is possible to install the swinging device readily, in a position that is distant from the distribution guide body.

BRIEF DESCRIPTION OF THE DRAWINGS

FIG. 3A is a schematic side view of the transfer apparatus on the whole;

FIG. 3B is a schematic side view of the transfer apparatus, showing a group of guide devices;

DETAILED DESCRIPTION OF PREFERRED EMBODIMENT

Figure 1:
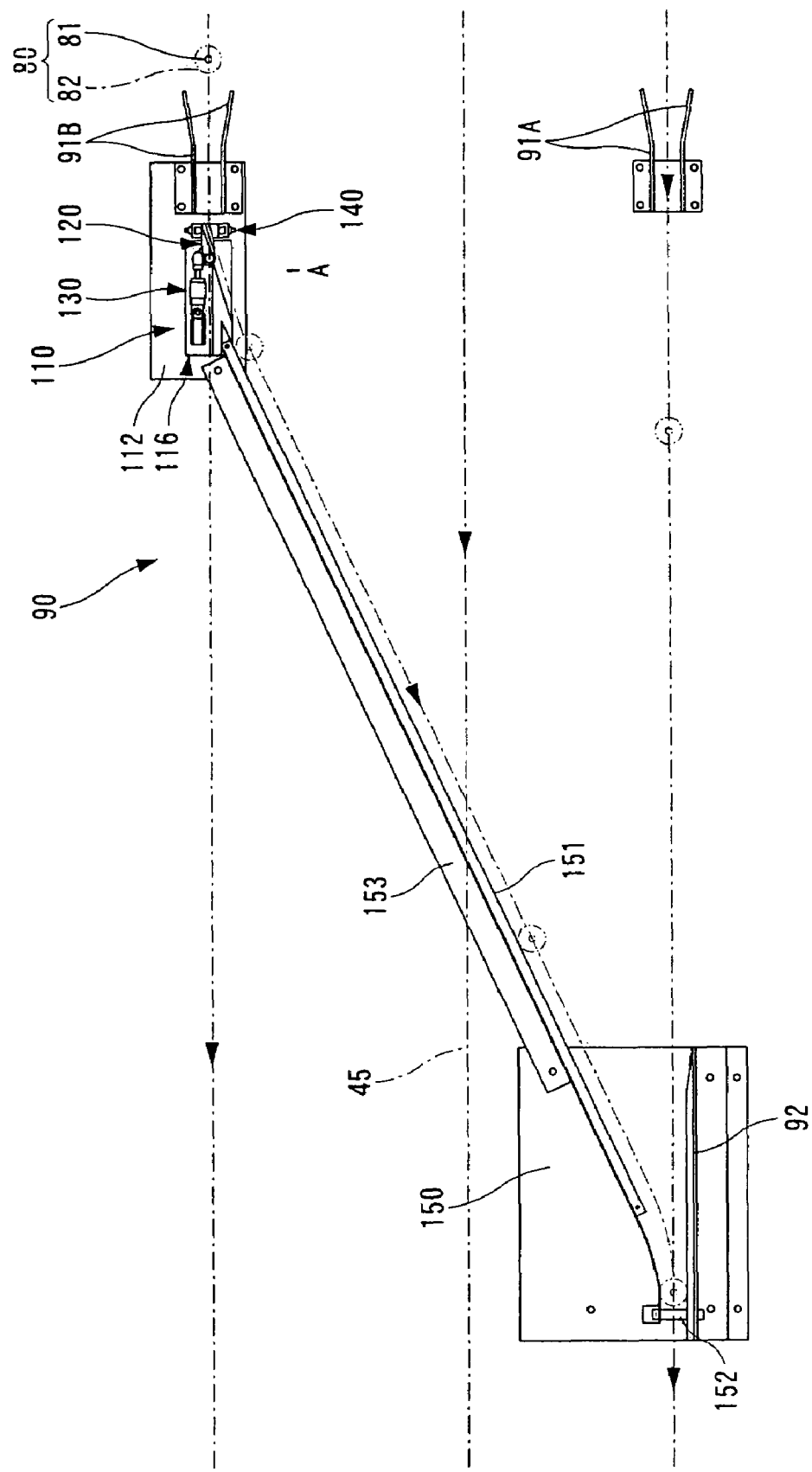
FIG. 1 a plan view of left-side distributing means in a transfer apparatus according to a first embodiment of the present invention.

Below, a first embodiment of the present invention is described on the basis of the drawings.

In FIG. 2, FIG. 3A, FIG. 6, and FIG. 8-FIG. 10, numeral 1 denotes a main frame, which comprises frame bodies 10, 20 disposed respectively as an upper and a lower pair on either side, an intermediate frame member 2 connected between the upper and lower, left and right-hand frame bodies 10, 20, and a leg frame 3, or the like, connected in a continuous fashion below the underside frame body 20, and the intermediate frame member 2 is constituted by a vertical connecting member 4 and a lateral connecting member 5, and the like.

The upper frame body 10 is formed in a rectangular fashion in sectional view, by means of a moulded aluminium body, an upward standing section 11 is formed in the central portion thereof, and cutaway-shaped step sections 12, 13 are formed in the inner and outer sides of the standing section 11. Moreover, an upwardly orientated mitre groove 14 is formed at the upper end of the standing section 11, and an inner downwardly orientated mitre groove 16 and an outer downwardly orientated mitre groove 17, are formed at the lower end thereof.

Furthermore, an outward path guide rail section 18 for supporting and guiding an article supporting body is formed on the upper frame body 10, projecting inwardly from the position of the inner side step section 12. The mitre grooves 14-17 and the outward path guide rail section 18, and the like, are formed integrally along the whole length of the upper frame body 10, at the time of forming thereof.

The lower frame body 20 is formed in a rectangular shape in cross section, by means of a moulded aluminium object, and an inner upwardly orientated mitre groove 21 and an outer upwardly orientated mitre groove 22 are formed in the upper end thereof, in addition to which an inner downwardly orientated mitre groove 23 and an outer downwardly orientated mitre groove 24 are formed in the lower end thereof. Furthermore, a return path guide rail section 25 for supporting and guiding an article supporting body is formed projecting towards the inner side from an intermediate portion of the inner side of the lower frame body 20, in addition to which an upper end extension section 27 is formed in such a manner that it is positioned above the step section 26 formed by the return path guide rail section 25. The mitre grooves 21-24, and the return path guide rail section 25, and the like, are formed integrally in the lower side frame body 20, throughout the whole length thereof, at the time of forming thereof.

The intermediate frame member 2 is joined integrally with the upper frame body 10, by positioning plate-shaped nut members 6 in the two downwardly oriented mitre grooves 16, 17 of the upper frame body 10, and screwing and fastening bolts 7 which are passed through the lateral connecting member 5 of the intermediate frame member 2, from below, into the nut members 6. Furthermore, by using the two upwardly orientated mitre grooves 21, 22 of the lower frame body 20, it is also joined integrally to the lower frame body 20, by means of nut members 6, similarly to the foregoing description. A plurality of intermediate frame members 2 are disposed at prescribed intervals in the longitudinal direction of the two frame bodies 10, 20. Moreover, the aforementioned leg body 3 is connected to the lower frame body 20 by means of nut members 6 and bolts 7, by using the outer downwardly oriented mitre groove 24 of the lower frame body 20.

A laterally orientated idle shaft 30 is disposed rotatably at the front end portion of the main frame 1 constituted in this manner, and a driving shaft 31 aligned in the same direction is disposed rotatably at the rear end portion thereof. Here, the idle shaft 30 and the driving shaft 31 are respectively supported rotatably via bearing devices 33, on a pair of right and left supporting members 32 disposed between the two frame bodies 10, 20. A drive device 34 which is coupled and connected to the driving shaft 31 comprises an electric motor 35, and a reducing gear device 36 integrated with the same, the output section of this reducing gear device 36 being connected to the driving shaft 31.

At the respective ends of the idle shaft 30 and the driving shaft 31, an endless chain (one example of an endless rotating body) 40 is provided, by means of sprockets (one example of wheel bodies) 38, 39. Here, the sprockets 38, 39 are provided inside the aforementioned supporting members 32. Furthermore, each chain 40 is constituted by links 41 and link pins 42, and prescribed link pins 42*a* project inwards at a prescribed pitch.

The chain 40 is disposed inside the inner step section 12, on the outward path side, and it is disposed inside the step section 26 in the return path. A plurality of article supporting bodies 50 are installed between the right and left chains 40. Here, the article supporting bodies 50 are disposed in such a manner that the longitudinal direction 51 thereof is the direction which is perpendicular to the main conveyance path 45 forming the direction of travel of the two chains 40.

As shown in FIG. 6, FIG. 8-FIG. 10 and FIG. 14, each article supporting body 50 is constituted by an article loading plate section 53 wherein recess sections 52 extending in the longitudinal direction 51 are formed in a planar surface, at two positions (or a single position or a plurality of positions) in the direction of the main conveyance path 45, a pair of leg plate sections 54, disposed in respective positions in the direction on the main conveyance path 45, connected to the intermediate portion of the rear surface of the article loading plate section 53, and extending in the longitudinal direction 51, a front plate section 55 extending downwards from the front end of the article loading plate section 53, a step-shaped front base plate section 56 joining the lower end of the front plate section 55 with the lower end of the front leg plate section 54, a rear plate section 57 extending downwards from the rear end of the loading plate section 53, and a step-shaped rear base plate section 58 joining the lower end of the rear plate section 57 with the lower end of the rear leg plate section 54.

A groove-shaped engaging section 59 which is open at the lower end is formed in the lower end of both of the leg plate sections 54. Furthermore, groove-shaped screw engaging sections 60 which are open on the lower end are formed respectively in the intermediate portion of the rear face of the article loading plate section 53, to the outer side of the leg plate sections 54.

At either end of the article supporting body 50 formed in this manner, in the longitudinal direction 51 thereof, side members 61 are installed respectively by means of insertion couplings, or the like. As shown in FIG. 6, FIG. 8-FIG. 10, FIG. 14 and FIG. 15, these side members 61 are of the same shape, inwardly projecting longitudinal tube-shaped inserting sections 63 being provided at two positions, to the front and rear sides, on the upper portion of the inner surface of a main body section 62 which is long in the front/rear direction, and a pair of through holes 64 being formed between these inserting sections 63.

Furthermore, an externally projecting tubular connecting section 65 is formed in the main body section 62 of the side member 61, at one end thereof in the front/rear direction, at an intermediate vertical position in the outer surface thereof, and moreover, a recess-shaped engaging section 66 is formed on the other end in the front/rear direction, which is open in the outer direction from the other end, and in both the internal and external side directions. Here, the connecting section 65 is formed by a large diameter section 65*a* positioned on the main body 62 side, a collar section 65*b* positioned to the outer side of this large diameter section 65*a*, and a small diameter section 65*c* positioned to the outer side of the collar section 65*b*. One example of a side member 61 is constituted by the aforementioned elements 62-66, and the like.

The side member 61 formed in this manner is attached to either end of the article supporting body 50 by inserting the pair of inserting sections 63 into the front-side and rear-side pair of spaces 50*a* formed by the article loading plate section 53, the front plate section 55 (or the rear plate section 57), the front base plate section 56 (or the rear base plate section 58), and the screw engaging sections 60 of the article supporting body 50, and then engaging and fastening bolts 67 passed through the through holes 64 from the outer side, into the screw engaging sections 60.

In this case, if a pair of side members 61 are installed on either end of the article supporting body 50, then the connecting sections 65 become positioned in a distributed fashion, to the front and rear sides. By means of the prescribed link pins 42*a* of the endless chain 40 inserting into and engaging with the hole sections of the connecting sections 65, either end of the article supporting body 50 is connected to the endless chain 40, respectively, via the side members 61, and consequently, a plurality of article supporting bodies 50 are attached between the pair of right and left endless chains 40. In this case, the engaging section 66 of the side member 61 is fitted externally onto the large diameter section 65*a* of the connecting section 65 of the adjacently positioned side member 61.

A rotating body having a polyurethane outer circumference (this being one example of a guided member, and being constituted by a bearing configuration or a roller configuration, or the like) 68 is fitted externally over each connecting section 65, and more specifically, the small diameter section 65*c* thereof, and these rotating bodies 68 are supported and guided by the respective guide rail sections 18, 25 of the main frame 1.

Each of the article supporting bodies 50 is provided with an article lateral pushing body 70, which is guided by the article supporting body 50 and is capable of moving in the longitudinal direction 51. This article lateral pushing body 70 is fitted externally over the article supporting body 50, and it is formed in a rectangular tubular shape, by means of an upper plate member 71 opposing the loading plate section 53 from above, a front plate member 72 opposing the front plate section 55 from the front side, a rear plate member 73 opposing the rear plate section 57 from the rear side, and a base plate member 74 opposing the base plate sections 56, 58, and the like, from the under side, and the like.

From the other of the front/rear directions (the front direction) with respect to the base plate member 74 and the two leg plate sections 54, a projecting type engaged section 75 which is engaged by and guided by the rear face of the article supporting body 50 is formed, such that it engages with the engaging section 59 formed in the front leg plate section 54, from the under side thereof. Moreover, in the first of the front/rear directions (the rear direction) with respect to the base plate member 74 and the two leg sections 54, a rattle preventing section 76 is formed which abuts elastically with the rear face formed by the base plate section 58 of the article supporting body 50. Here, the rattle preventing section 76 is formed in a tongue shape, by providing a square U-shaped cutaway in the base plate member 74, and a section for abutting against the rear face is formed in a projecting fashion on the free end thereof.

Furthermore, the upper plate member 71 of the article lateral pushing body 70 is formed with a pair of projecting sections 77 which engage with the recess sections 52 formed in the article supporting body 50, from above, and guided sections 78 are formed in the base plate member 74, which engage between the two leg plate sections 54 and slide against and are guided by the same. The article lateral pushing body 70 is made from synthetic resin, for example, and in this case, an acting section 79 for performing lateral pushing is formed integrally on the surface of the upper plate member 71. One example of an article lateral pushing body 70 is constituted by the foregoing elements 71 to 79, and the like.

A guided body 80 is installed by means of the aforementioned guided section 78. In other words, a roller shaft 81 is suspended from the central portion of the guided section 78, by supporting the upper portion thereof by means of a buried moulding, and a guide roller 82 is installed in a freely rotatable manner in the intermediate portion of this roller shaft 81. One example of a guided body 80 is constituted by the roller shaft 81, guide roller 82, and the like, and thus, the guided body 80 is provided to the outside of the rear face of the article lateral pushing body 70.

In the upper frame body 10, an upper cover 83 which encloses the upper region of the step section 12 is provided over the inner step section 12 which forms an outward path guide rail section 18, together with providing an endless chain 40. Bolt holes 84 are formed at a plurality of positions in the upper cover 83, in the longitudinal direction thereof. The upper cover 83 is formed with bolt holes 84 in a plurality of positions in the longitudinal direction. In a state where it is installed on the standing section 11 from above, the upper cover 83 is affixed to the upper frame body 10 by screwing bolts 85 passing through the bolt holes 84 into nut members 86 previously positioned inside the inner side upwardly oriented groove section 14.

As shown in FIG. 1, FIG. 3B, FIG. 4, FIG. 8 and FIG. 9, an outward path guide device 90 which guides the guide roller 82 is provided on the upper lateral connecting member 5 in the intermediate frame member 2 of the main frame 1, and furthermore, a return path guide device 100 is provided on the lower lateral connecting member 5. Left-side distributing means (one example of distributing means) 110 and right-side distributing means (one example of distributing means) 111 are provided at a branching section A of the outward path, and furthermore, switching means 103 is provided at a branching section B in the centre region of the return path.

The outward path guide device 90 comprises start side guide sections 91A, 91B provided respectively as a left and right-hand pair on either side of the start section, an upstream guide section 92 opposing the end side of the left-side distributing means 110, a downstream guide section 93 opposing the end side of the right-side distributing means 111, and a pair of left and right-hand end side guide sections 95A, 95B positioned respectively on the lines of extension from the start side guide sections 91A, 91B.

The return path guide device 100 is constituted by a left and right-hand pair of inner movement guide sections 101A, 101B which incline inwardly in the downstream direction, and a left and right-hand pair of outer movement guide sections 102A, 102B which oppose the end side of the inner movement guide sections 101A, 101B, via the aforementioned switching means 103, and incline outwardly in the downstream direction.

Figure 2:
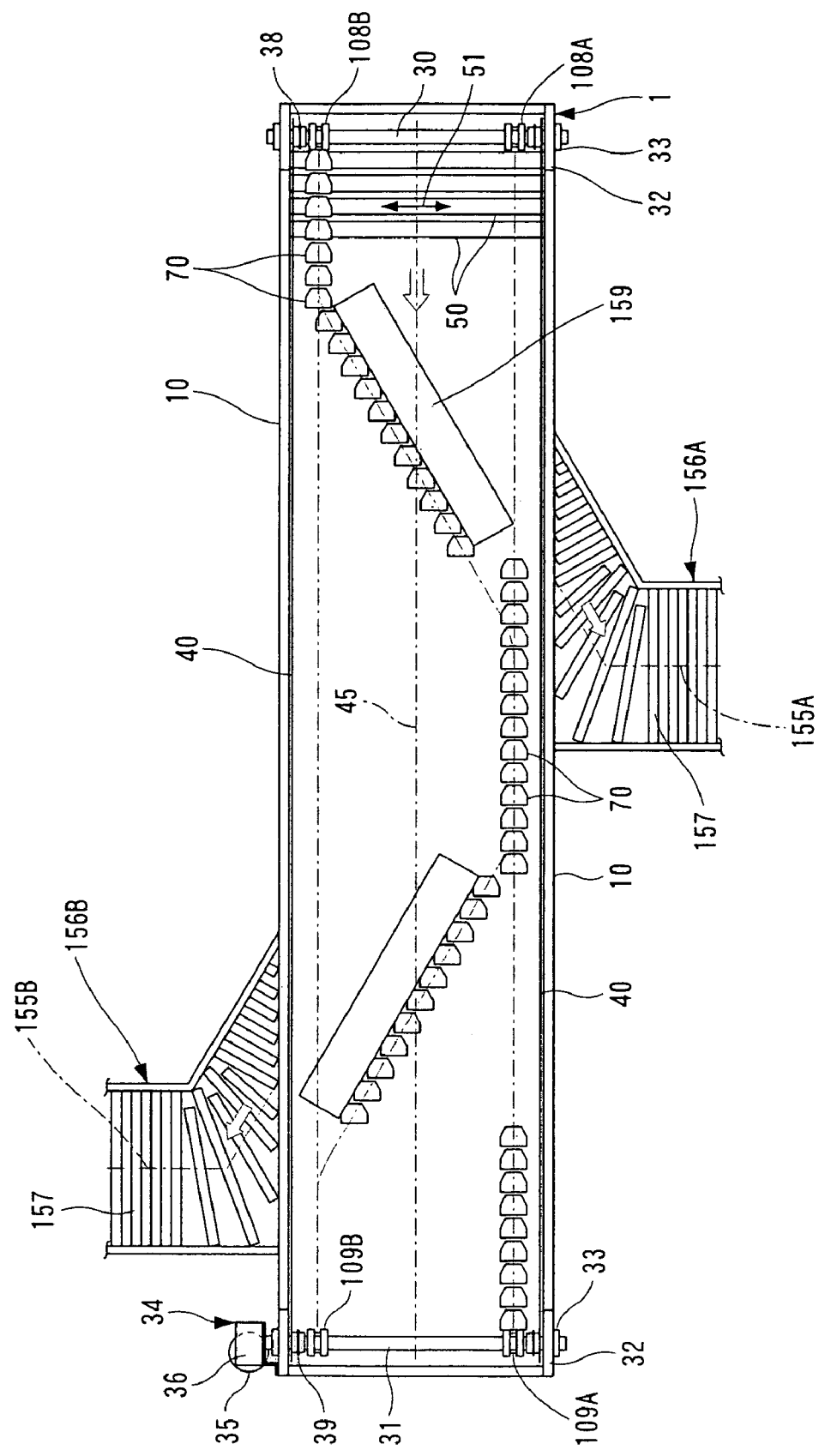
FIG. 2 is a schematic plan view of the transfer apparatus.
Figure 9:
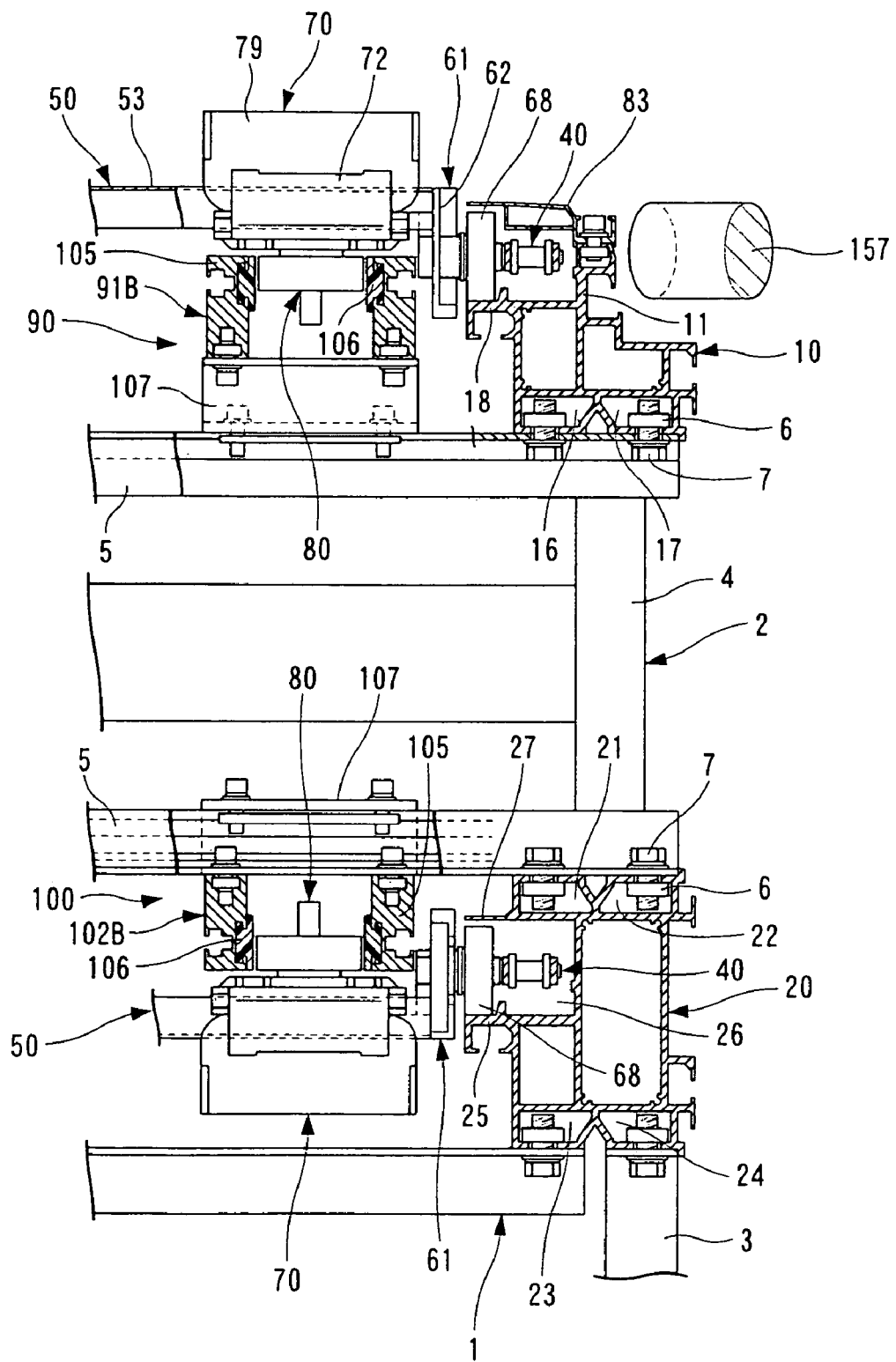
FIG. 9 is a vertical sectional front view of the principal part of the transfer apparatus.

As indicated by the start side guide section 91B in FIG. 9 and the outer moving guide section 102B, the two guide devices 90, 100 are constituted by a main body 105 consisting of an aluminium extruded moulding, and a resin guide plate 106 which is attached to the inner face of this main body 105, the main body 105 being fixed to the lateral connecting member 5 by means of a bracket 107. As shown in FIG. 2, reversing guide bodies 108A, 108B, 109A, 109B which allow interlocking of the guide rollers 82 are installed on a portion of the respective shafts 30, 31, in order that the guide rollers 82 are guided at the start and end reversing sections.

The left-side distributing means 110 and the right-side distributing means 111 are constituted in the same shape, but having opposing distributing directions, and hereinafter, the left-side distributing means 110 is described as shown in FIG. 1, FIG. 8, FIG. 10 to FIG. 13, FIG. 16, and FIG. 17, and the right-side distributing means 111 is labelled with the same reference numerals and detailed description thereof is omitted.

The left-side distributing means 110 is capable of distributing and guiding a guided body 80, and as well as providing the other start side guide section 91B at the start section, over an upper base body 112 positioned to the right-hand side thereof, a single block body 116 and a distribution guide body 120 are also provided respectively. More specifically, fixing through holes 113 are formed in a prescribed plurality of positions in the upper base body 112, and furthermore, a coupling through hole 114 is formed in a prescribed location. The block body 116 is fixed to the upper base body 112 by means of the fixing through holes 113.

The block body 116 is formed by a long rectangular main body section 116a, a thin seating plate section 116b extending forwards and outwards from the lower portion of the front end and the lower portion of the outer end of the main body section 116a, and a distribution director section 116c provided in an upwardly projecting fashion from the inner side section of the upper face of the main body section 116a. A plurality of fixing through holes 117 capable of connecting with the fixing through holes 113 are formed in the seating plate section 116b of the block body 116, and a swing support through hole 118 capable of connecting with the coupling through hole 114 is formed in the seating plate section 116b, in the outer side portion which confronts the corner between the front end and the outer end of the main body section 116a.

In plan view, the distribution director section 116c is formed with an acute-angled projecting shape towards the upstream side, and a linear pin guide face (distribution guide face) 116d is formed on the outer side face thereof, in addition to which, the inner side face is formed with a pin guide face (distribution guide face) 116e that inclines inwardly towards the downstream side. In this case, the upstream end section of the distribution director section 116c projects towards the upstream side with respect to the main body section 116a and is positioned above the through hole 118, and the upstream end section of the pin guide face 116e is formed into a curved face 116f.

The block body 116 having the foregoing composition is fixed to the upper base body 112 by connecting the fixing through holes 117 to the fixing through holes 113, and introducing coupling members (nuts, bolts, and the like) 119 to act between the fixing through holes 117, 113, in such a manner that the block body 116 is fixed in a prescribed orientation and is prevented from rotating.

The distribution guide body 120 comprises a long rectangular main body section 120a, a cylindrical boss section 120b suspended from the lower face of the downstream side of the main body section 120a, a distribution guide section 120c provided in an upwardly projecting fashion from the inner side portion of the upper face of the main body section 120a, and a plate-shaped coupling section 120d extending in an outward direction from a portion of the boss section 120b, and it is formed in an integral fashion from resin, or the like. A coupling through hole 121 capable of coupling with the through hole 118 or the coupling through hole 114 is formed in the boss section 120b, and a coupling hole 122 corresponding to an electrical extension and contraction drive device (described hereinafter) is formed in the coupling section 120d.

Pin distributing faces (distribution guide faces) 120e, 120f are formed respectively in the outer face and inner face of the distribution guide section 120c. Furthermore, stopper receiving faces 120g, 120h are formed respectively on the outer side face and the inner side face of the main body section 120a.

By causing a swingable support shaft (nut and bolt type coupling arrangement, or the like) 125 to act between the through holes 121, 118, 114, in a state where the lower face of the boss section 120b abuts against the side of the seating plate section 116b, and the coupling through hole 121 is made to connect with the through hole 118 and coupling through hole 114, the distribution guide body 120 is coupled swingably about a vertical axis 126, to the block body 116. A collar 127 which fits externally onto a swingable support shaft 125 is provided inside the coupling through hole 121.

A step section 123 is formed in a position towards the bottom of the distribution guide section 120c, and a portion of the distribution director section 116c that projects on the upper side thereof is positioned in this step section 123. Thereby, when performing coupling as described above, the end section of the distribution guide body 120 and the start section of the distribution director section (one example of a distribution director body) 116c overlap in the vertical direction, in such a manner that the pin distribution face 120f of the distribution guide body 120 and the curved face (distribution guide face) 116f of the distribution director section 116c are connected in a continuous fashion.

An electrical extension and contraction drive device 130 coupled to the distribution guide body 120 is provided on the upper base body 112. This electrical extension and contraction drive device 130 is a linear motor, and is constituted by a cylindrical linear motor section 131 and a rod 132 which moves linearly in a state where it is fitted into the linear motor section 131. The linearly moving rod 132 is coupled to the distribution guide body 120 in a relatively swingable fashion about a vertical pin.

More specifically, a base end side bracket 133 provided on the base end side of the linear motor section 131 is coupled to a coupling member 134 provided on the seating plate section 116b, in a rightward and leftward swingable fashion, by means of a vertical support shaft 135. Moreover, a free end side bracket 136 provided on the free end of the rod 132 is coupled to the coupling section 120d of the distribution guide body 120, in a relatively swingable fashion, by means of a vertical pin 137 which passes through the coupling hole 122 thereof. One example of the left-side distributing means 110 is constituted by these elements 112-137, and the like.

Swing amount controlling means 140 against which the distribution guide body 120 can abut is provided on the upper base body (fixed side) 112. More specifically, a U-shaped bracket body 141 is coupled to the top of the upper base body 112 by means of a coupling member (bolt) 142, and soft elastic first stopper bodies 143A, 143B (made of rubber) are disposed respectively on the mutually opposing faces of the pair of vertical plate sections in the bracket body 141, and are fixed by fixing members 144A, 144B. Hard elastic second stopper bodies (made of urethane) 145A, 145B are disposed respectively on the base plate section of the bracket member 141, below the first stopper bodies 143A, 143B, and are fixed by fixing members 146A, 146B.

The free end portion of the main body section 120a of the distribution guide body 120 is positioned between the respective stopper bodies 143A, 145A, 143B, 145B, and the stopper receiving faces 120g, 120h are mutually opposed. In this case, the first stopper bodies 143A, 143B which have a soft elastic force project inwards (towards the stopper receiving faces 120g, 120h) by a certain dimension L with respect to the second stopper body 145A, 145B which have a hard elastic force, and therefore, once the distribution guide body 120 abuts against the first stopper bodies 143A, 143B, the first stopper bodies 143A, 143B deform elastically and the distribution guide body 120 abuts against the second stopper bodies 145A, 145B. One example of swing amount controlling means 140 is constituted by the aforementioned elements 141-146A, 146B, and the like.

As shown in FIG. 1, FIG. 4, FIG. 8, FIG. 10 and FIG. 11, the upper guide section 92 is provided on a lower base body 150, and this lower base body 150 is parallel to the upper base body 112 and it is positioned to the left-hand side and slightly below the upper base body 112. A distribution director body 151 for guiding the guide roller 82 in a distributed guided body 80 is disposed in the region between the upper base body 112 and the lower base body 150.

The distribution director body 151 is band-shaped, the start portion thereof being coupled to the upper base body 112 in the vicinity of the block body 116, and the end portion thereof being coupled to the upper guide section 92, via a coupling body 152, in a state where it is separated by a prescribed interval from the upper guide section 92. The intermediate portion of the distribution director body 151 is maintained at an inclined attitude, by means of a bracket 153, and the like, provided between the two base bodies 112, 150.

As shown in FIG. 2, FIG. 7, FIG. 9 and FIG. 10, branching conveyors 156A, 156B forming branching conveyance paths 155A, 155B which are inclined outwards and downwards with respect to the main conveyance path 45 are provided to the outside of either side of the main frame 1. Here, the branching conveyors 156A, 156B have a plurality of rollers 157, and the rollers 157 are disposed in a state where the end portions thereof are positioned inside the step section 13 on the outer side of the upper frame body 10, and in a sufficiently proximate position with respect to the standing section 11. The outer side downward oriented mitre groove 17, and the like, of the upper frame body 10 can be used to couple the branching conveyors 156A, 156B. Numeral 159 denotes an article.

Below, the action of conveying and branching an article 159 in the first embodiment described above will be explained.

In other words, the electric motor 35 of the drive device 34 is operated, the sprocket 39 is caused to rotate forcibly by means of the drive shaft 31 that is connected to the reducing gear device 36, and ultimately the two endless chains 40 are moved. In accordance with the movement of these two endless chains 40, a group of article supporting bodies 50 can be moved in a state where they are supported and guided on the respective guide rail sections 18, 25, via the rotating bodies 68. Thereby, since the group of article supporting bodies 50 moves in a circular fashion, an article 159 supplied onto an article supporting body 50 at the start section can be conveyed along the main conveyance path 45.

When performing conveyance of this kind, the article lateral pushing bodies 70 which move integrally with the group of article supporting bodies 50 move reciprocally in the longitudinal direction 51 of the article supporting body 50, via the guided section 78, by means of the guided body 80 thereof being guided by the guide devices 90, 100, and they also move in a linear manner along the main conveyance path 45, together with the article supporting body 50.

Figure 4:
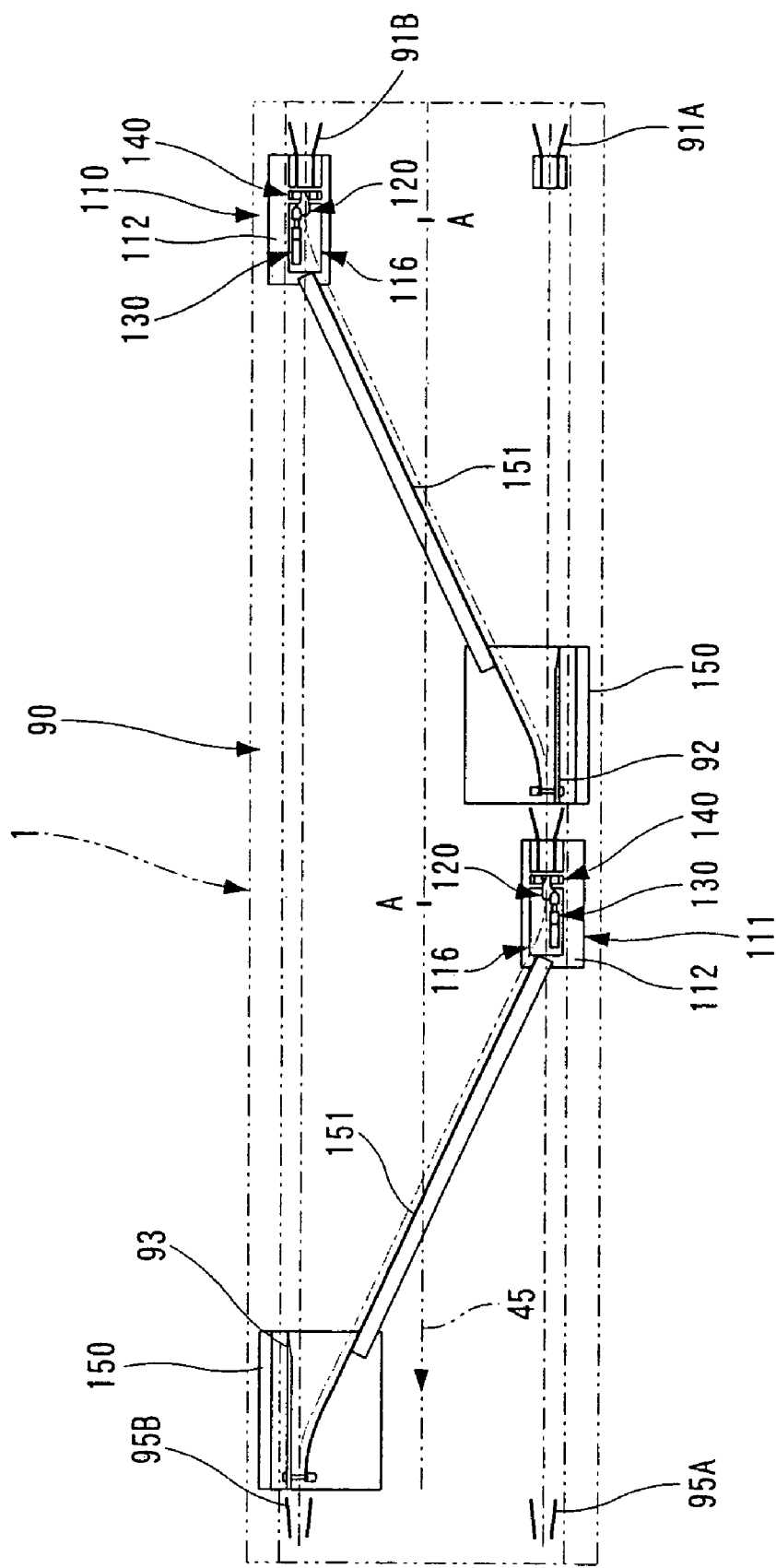
FIG. 4 is a schematic plan view showing a group of outward path guide devices of the transfer apparatus.
Figure 5:
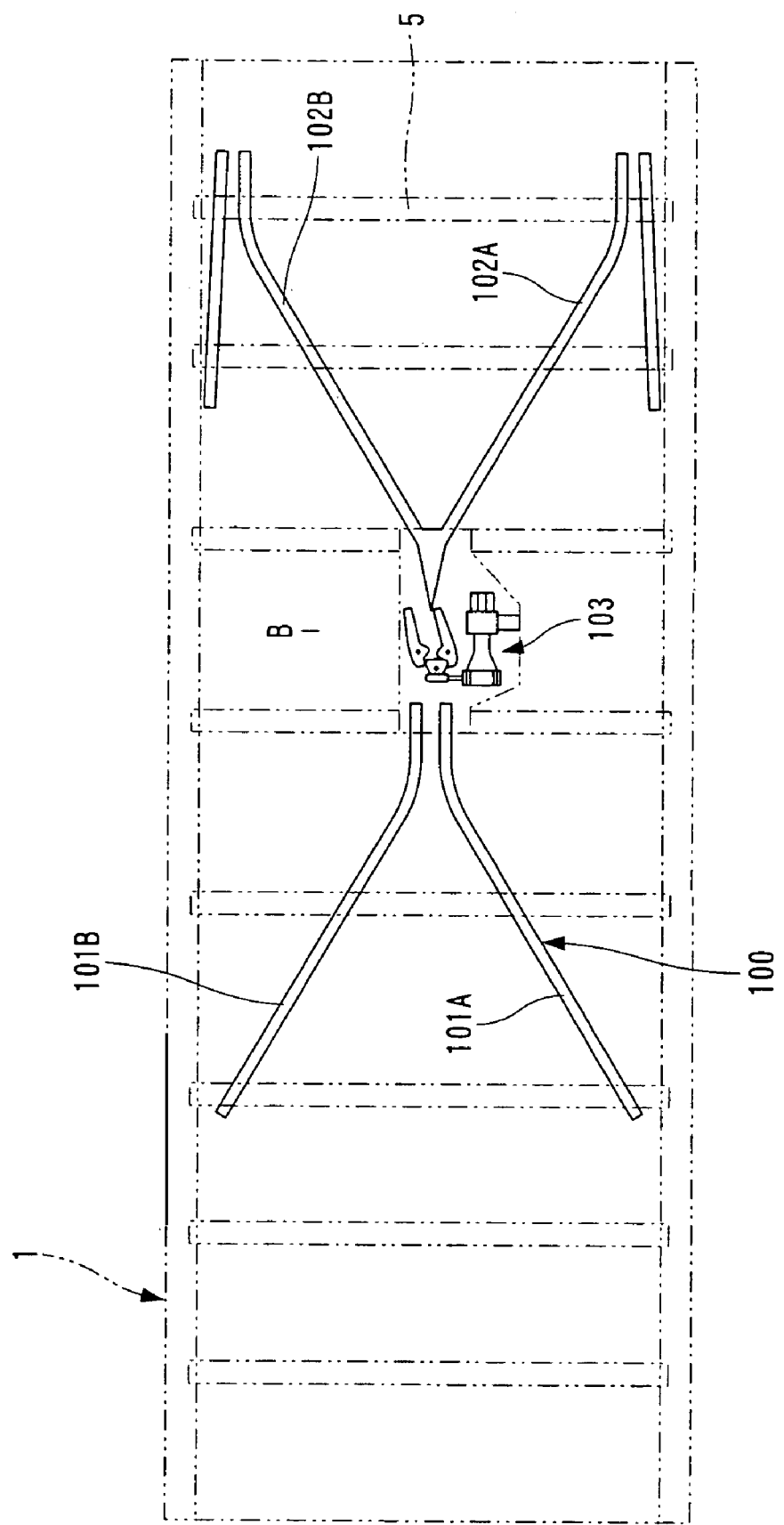
FIG. 5 is a schematic plan view showing a group of return path guide devices of the transfer apparatus.
Figure 6:
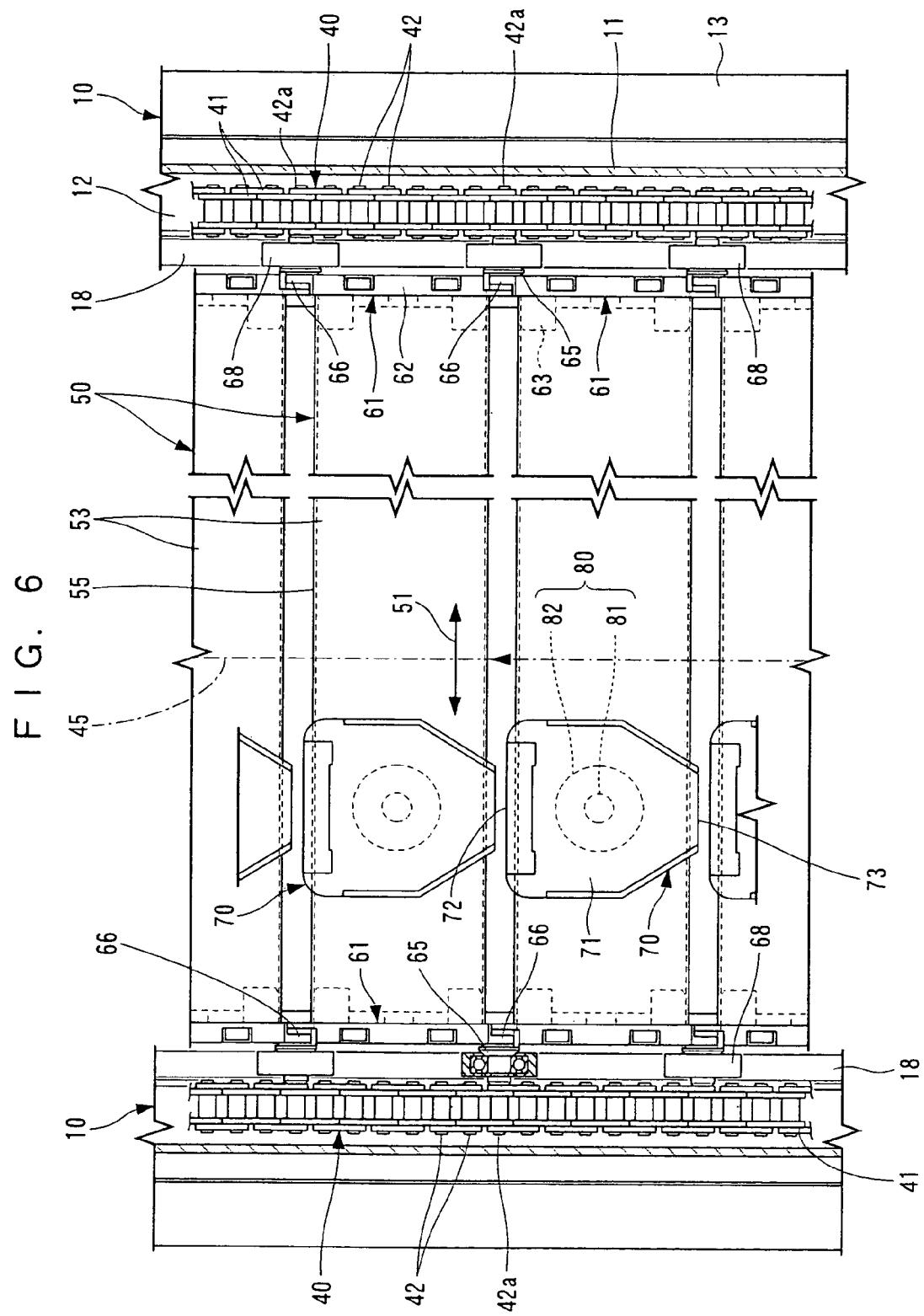
FIG. 6 is a partially cutaway plan view of a principal part of the transfer apparatus.
Figure 7:
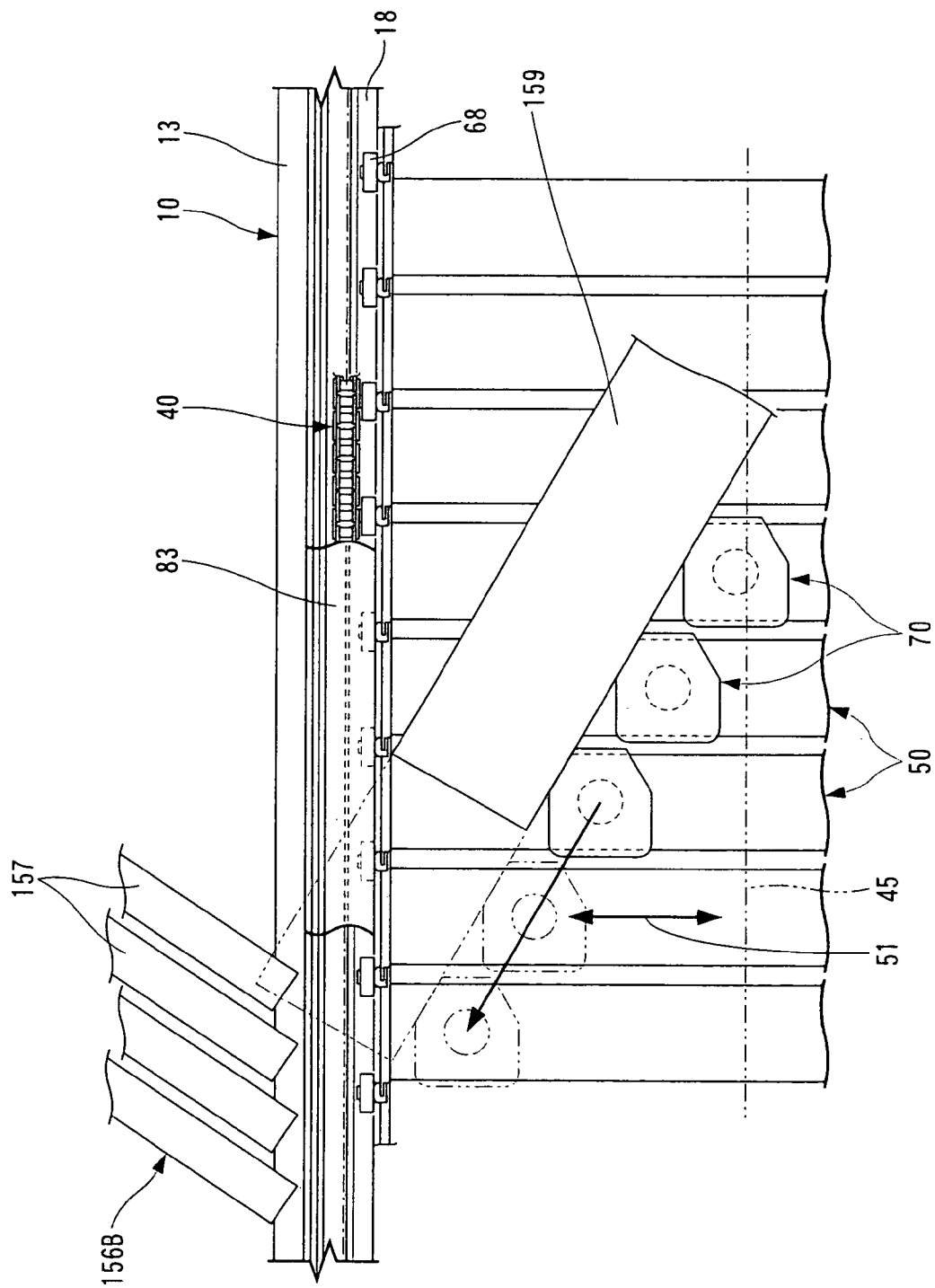
FIG. 7 is a plan view of the principal part of the transfer apparatus.

In other words, in FIG. 4, the guide roller 82 which is guided by the start side guide section 91A on one side, for instance, is guided onto the upper guide section 92, and travels straight ahead if the right-side distributing means 111 is in a non-distributing attitude, whereupon it is guided onto the end side guide section 95A. Consequently, the article lateral pushing body 70 does not act on the article 159, and the article 159 is conveyed straight ahead over the main conveyance path 45. The same applies to the other side, the guide roller 82 of the start side guide section 91B travelling straight ahead if the left-side distributing means 110 is set to a non-distributing attitude, whereupon it is guided onto the lower guide section 93 and then moved to the end side guide section 95B.

Figure 8:
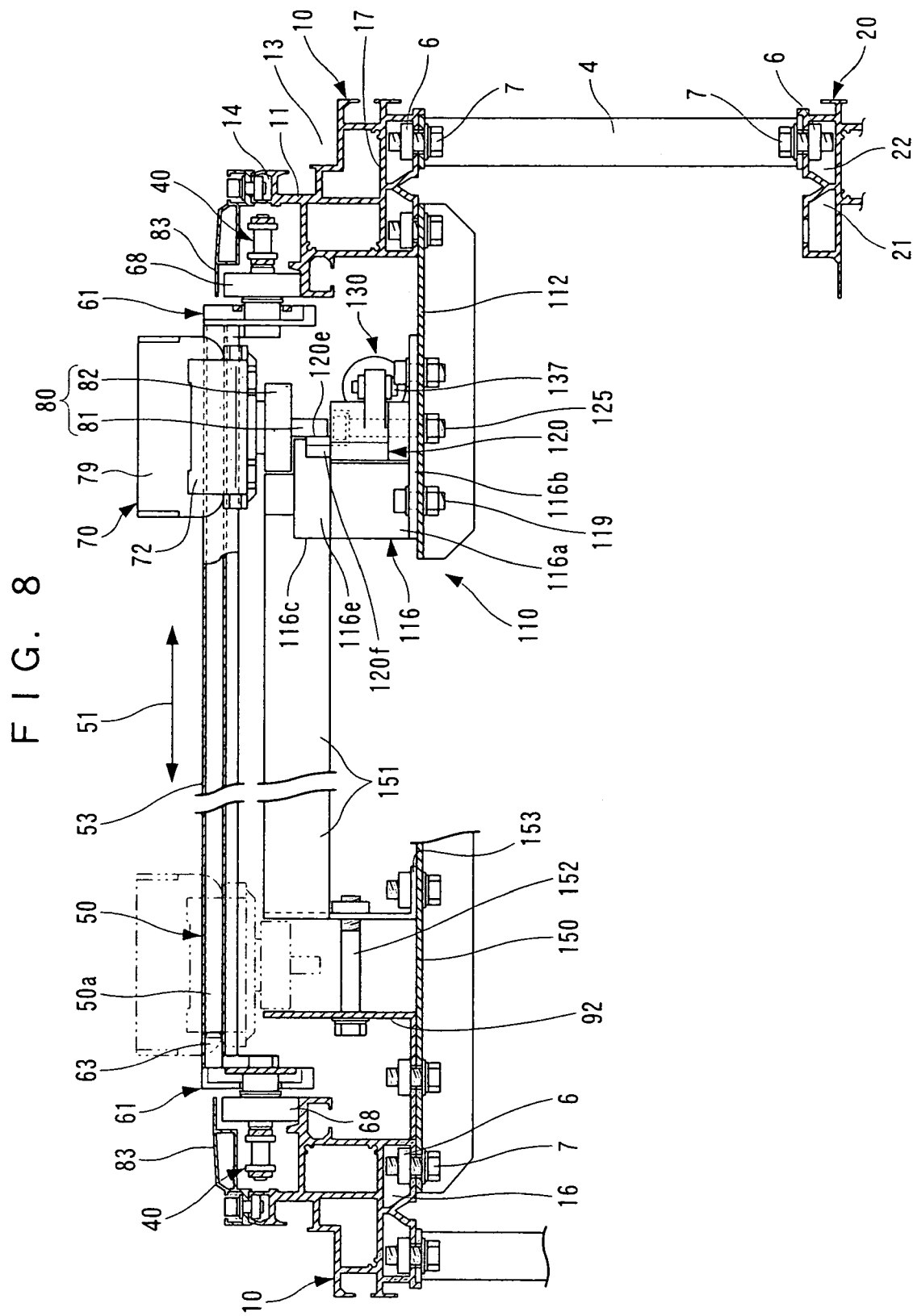
FIG. 8 is a partial cutaway front view of the principal part of the transfer apparatus.
Figure 10:
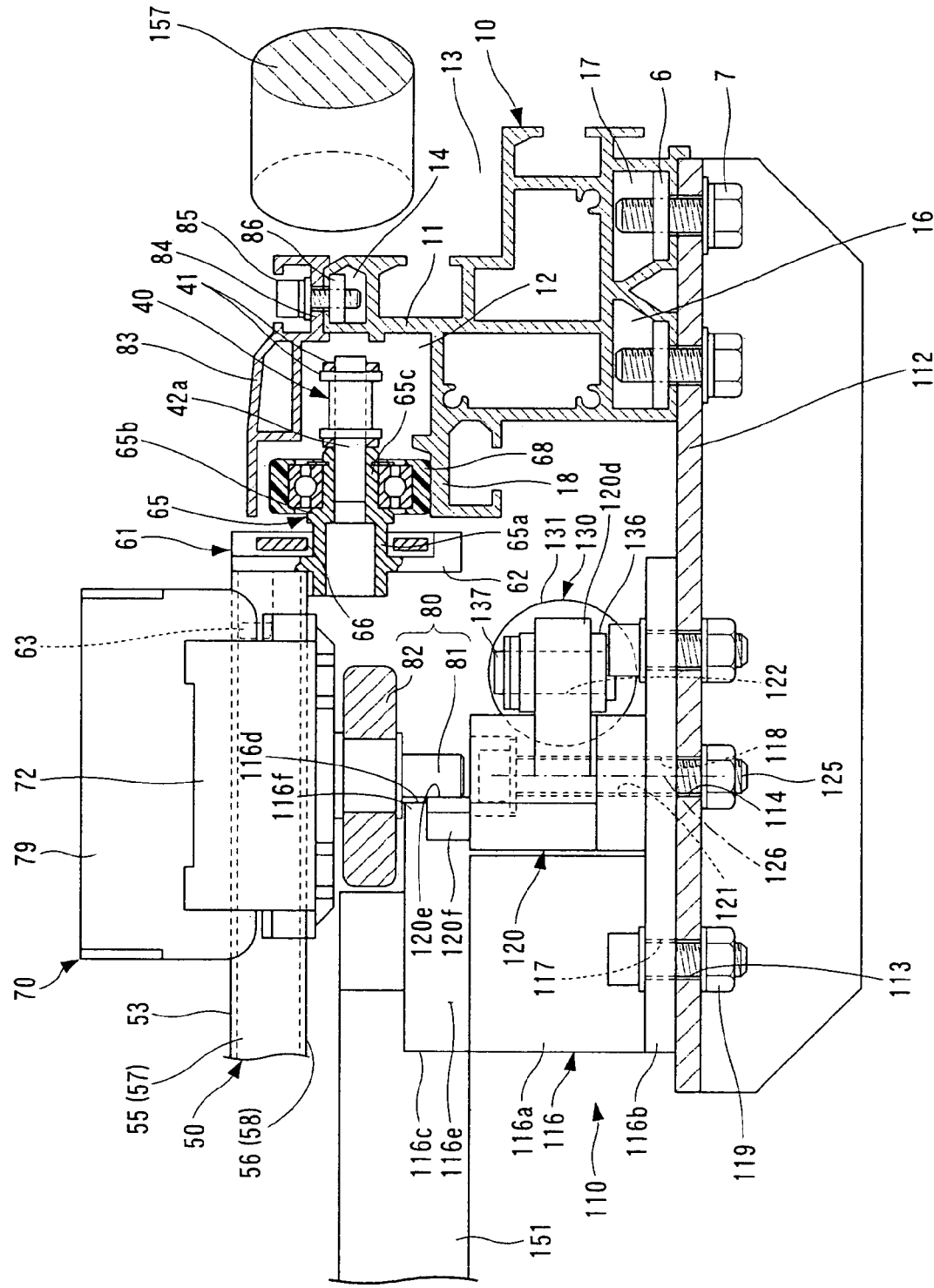
FIG. 10 is a partially cutaway front view of the left-side distributing means in the transfer apparatus.
Figure 11:
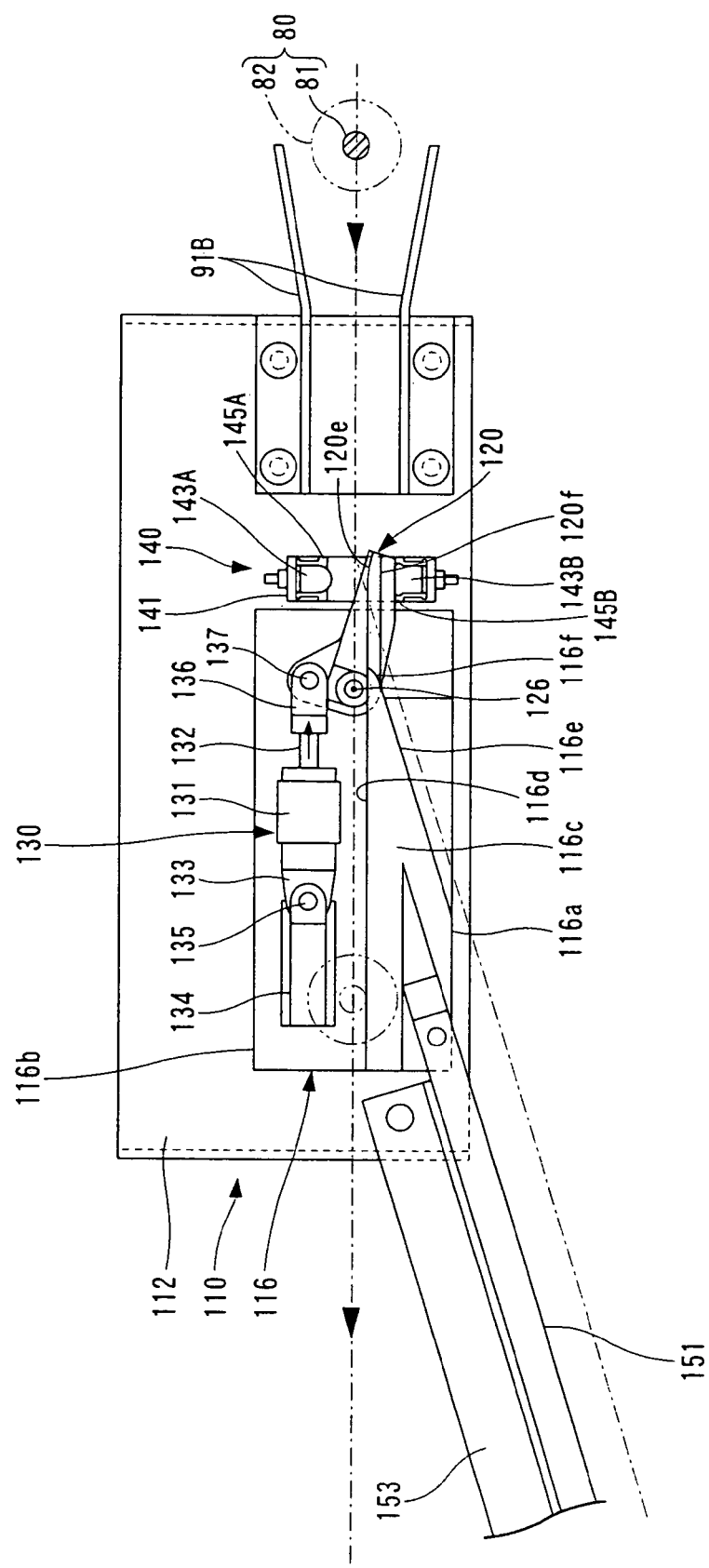
FIG. 11 is a plan view of a principal part of the left-side distributing means in the transfer apparatus, in a non-distributing attitude.

As shown in FIG. 8, FIG. 10 and FIG. 11, the non-distributing attitude of the left-side distributing means 110 and the right-side distributing means 111 described above can be adopted by means of the rod 132 being caused to extend by supplying electrical current in one direction to the coil of the linear motor section 131 in the electrical extension and contraction drive device 130, and hence causing the distribution guide body 120 to swing to the inner side, about the vertical axis 126. By this means, the pin distributing face 120e in the distribution guide section 120c assumes a position whereby it can receive the roller shaft 81 of the guide roller 82 guided by the start side guide section 91B on the other side.

In the swing amount controlling means 140, the stopper receiving face 120h on the inner side of the distribution guide body 120 which has been swung towards the inside, abuts against the inner side stopper bodies 143B, 145B of the swing amount controlling means 140. In this case, the stopper receiving face 120h on the inner side of the distribution guide body 120 first abuts against the first stopper body 143B which has a soft elastic force, and it causes this first stopper body 143B to deform elastically, whereupon it abuts against the second stopper body 145B which has a hard elastic force.

In the non-distributing attitude of this kind, for example, the roller shaft 81 from the start side guide section 91B on the other side is guided from the pin distributing face 120e on the outer side of the distribution guide body 120, to the pin guide face 116d on the outer side of the block body 116. Therefore, it is moved and passed straight through the section of the left-side distributing means 110, without being distributed.

Figure 12:
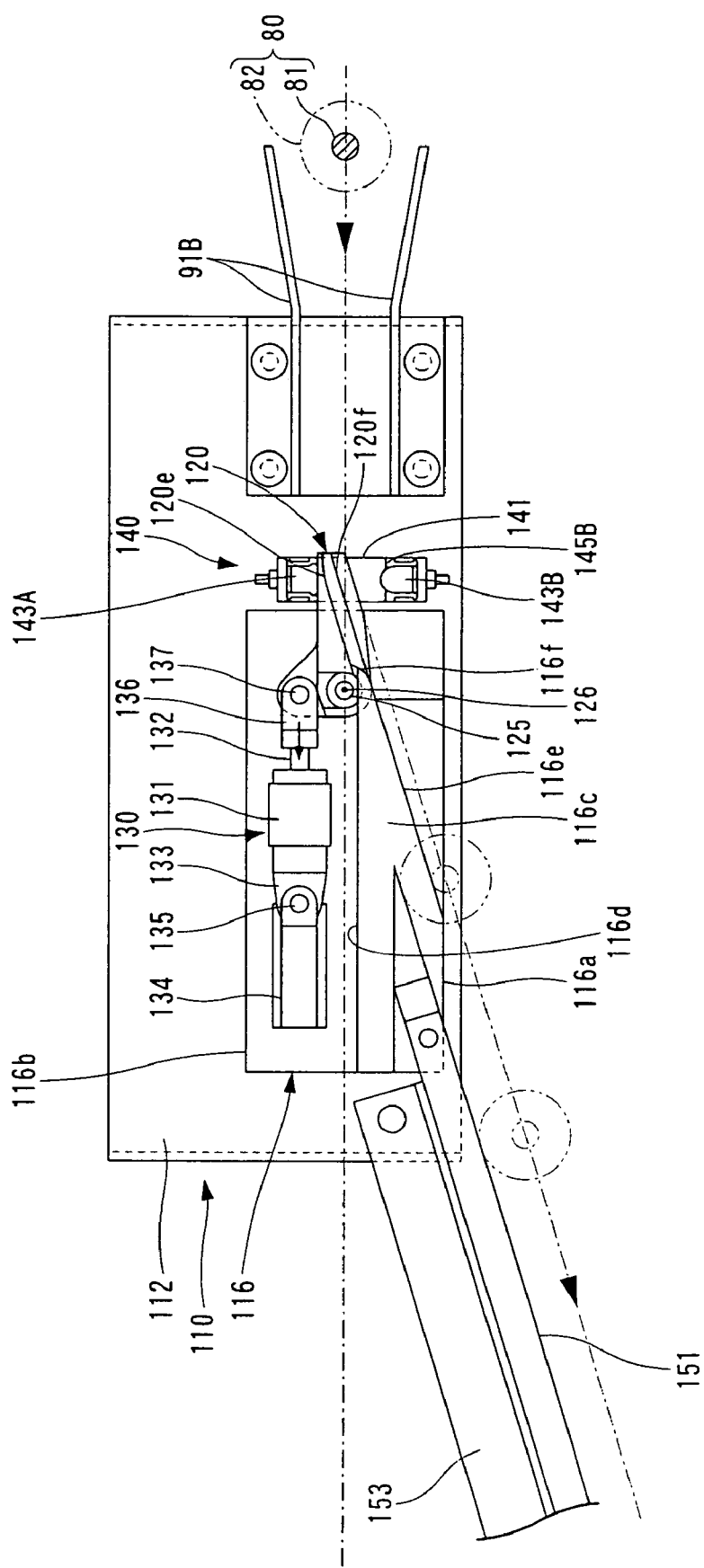
FIG. 12 is a plan view of the principal part of the left-side distributing means in the transfer apparatus, in a distributing attitude.
Figure 13:
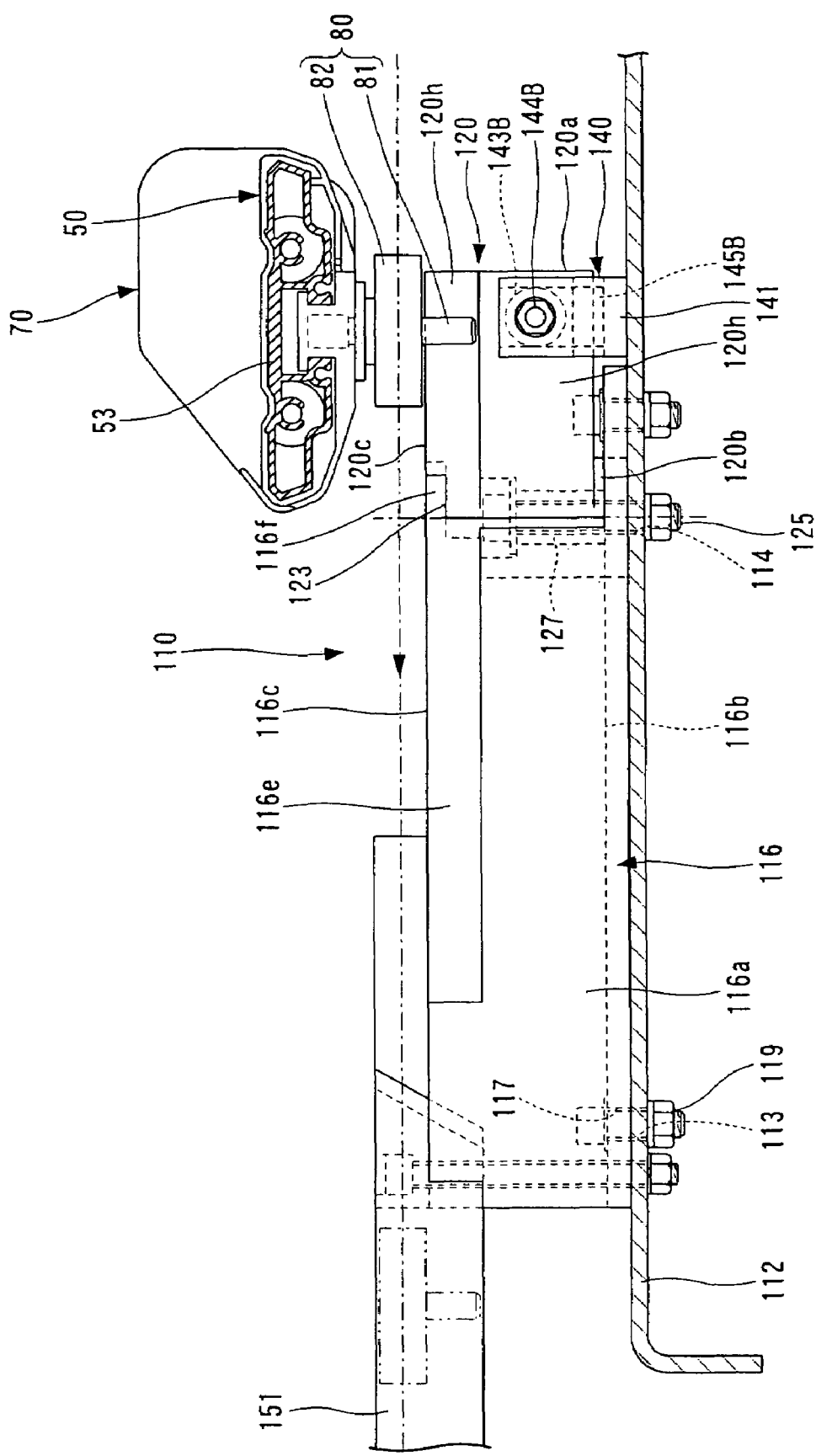
FIG. 13 is a side view of the principal part of the left-side distributing means in the transfer apparatus.
Figure 14:
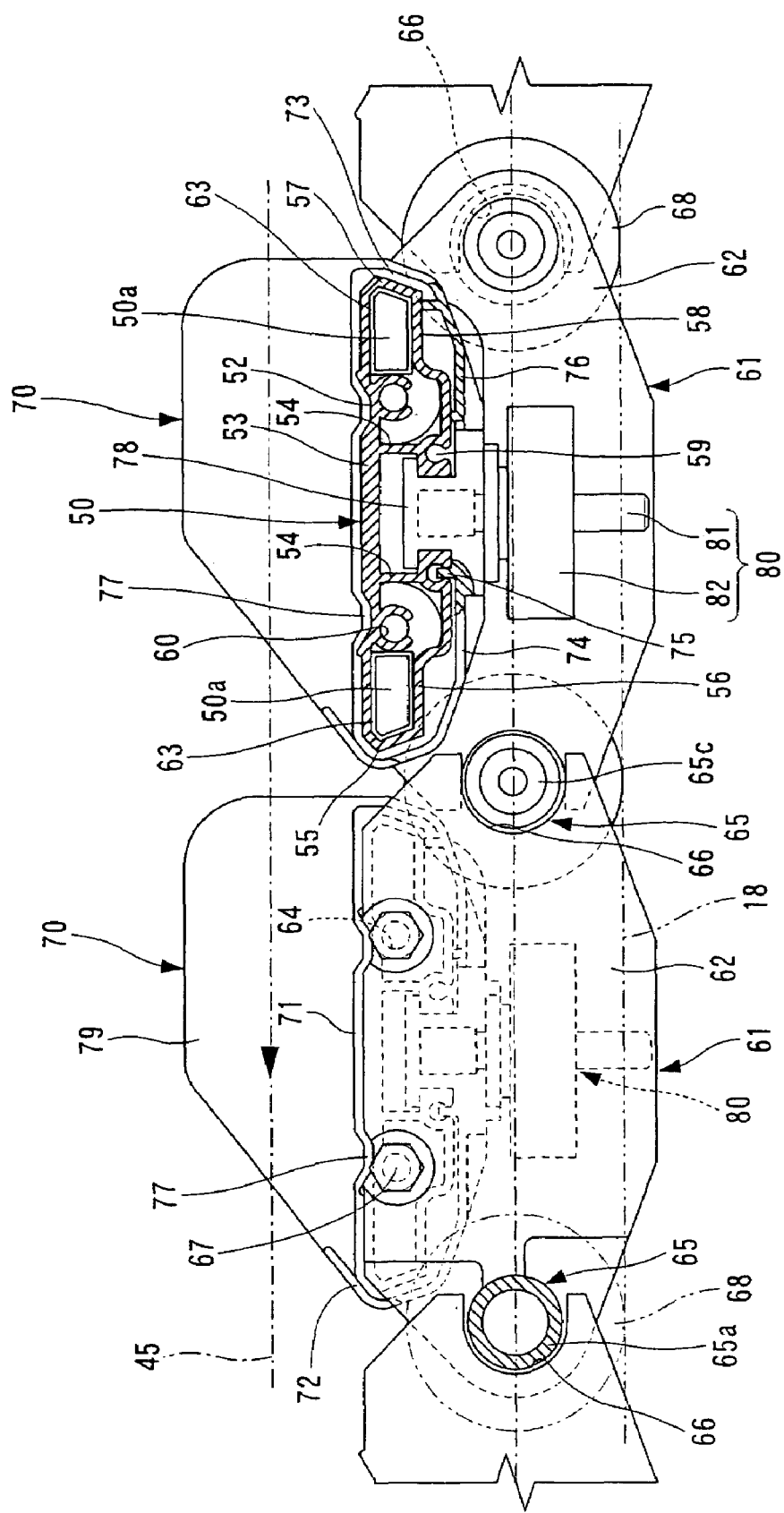
FIG. 14 is a partially cutaway side view of a region of an article supporting body on which an article lateral pushing body is installed in the transfer apparatus.
Figure 15:
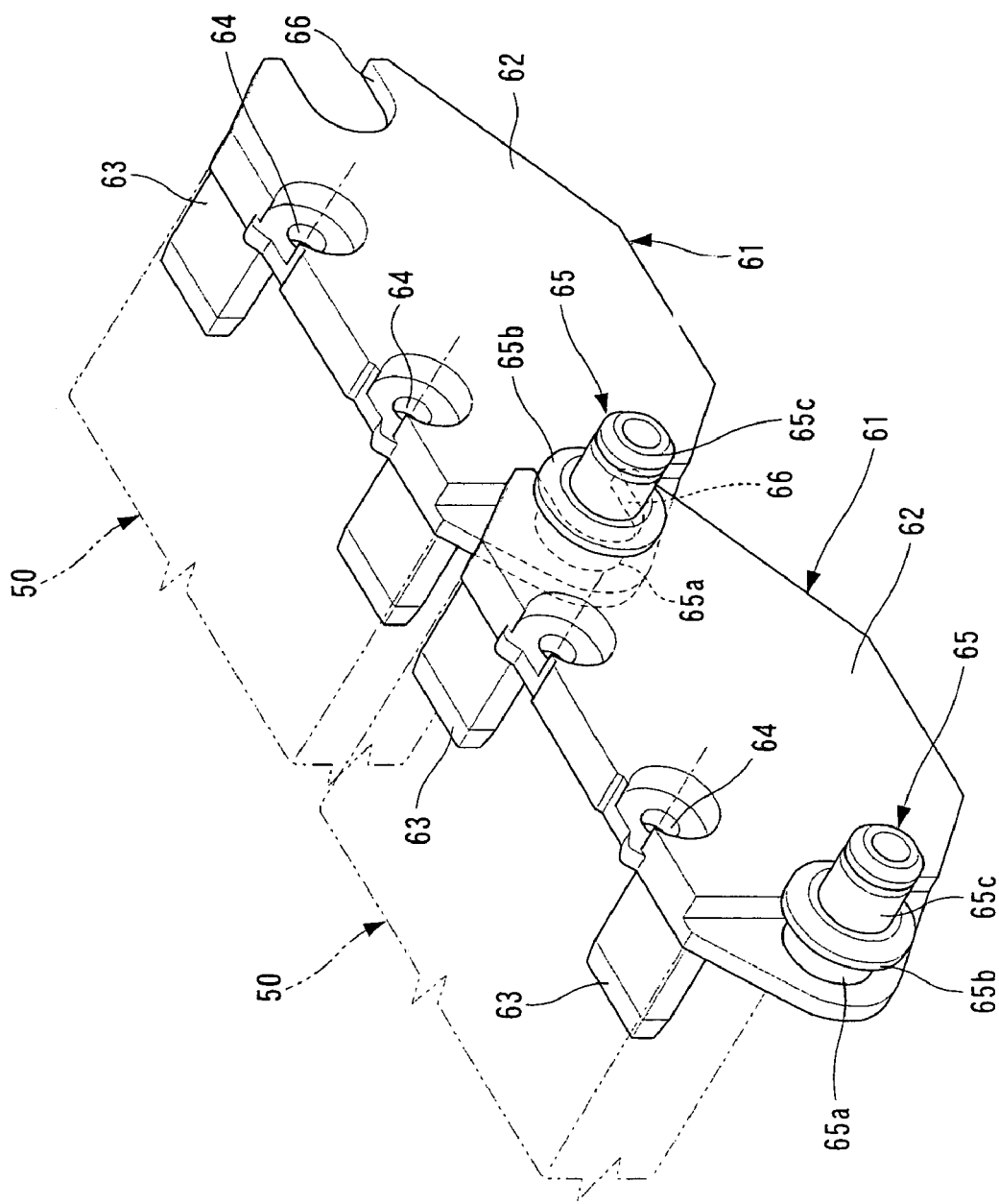
FIG. 15 is a perspective view of a side member of the transfer apparatus.
Figure 16:
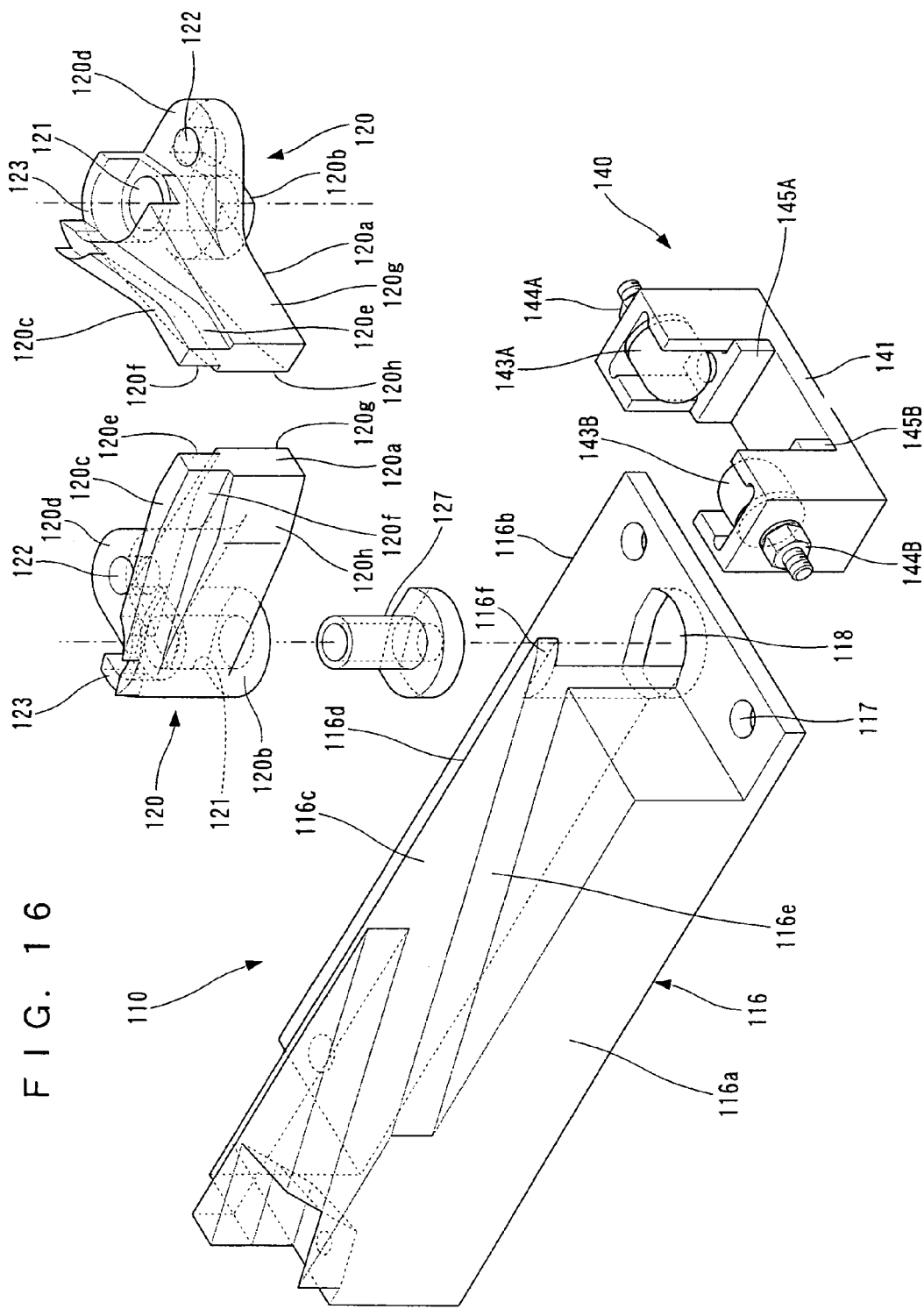
FIG. 16 is an exploded perspective view of a part of distributing means in the transfer apparatus.
Figure 17:
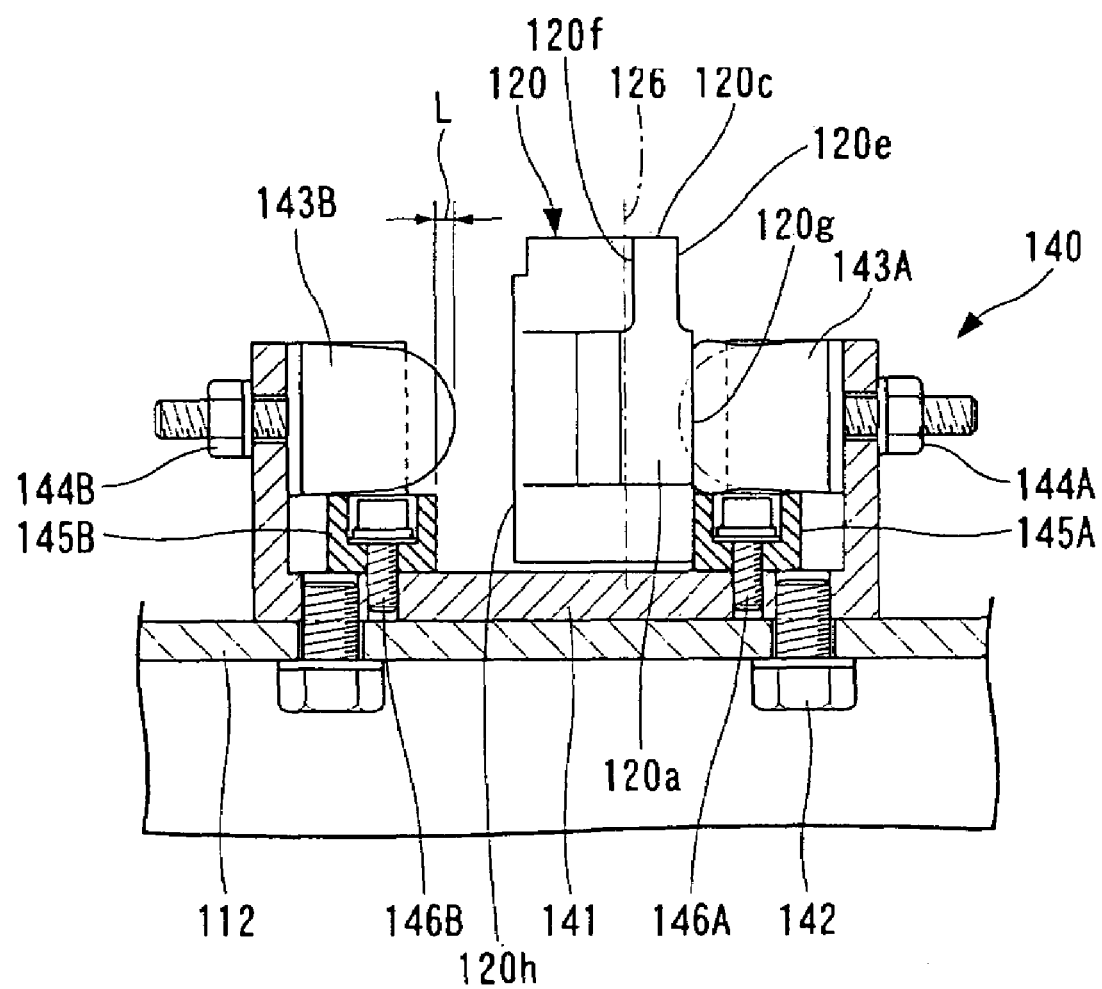
FIG. 17 is a partially cutaway front view of swing amount controlling means in the transfer apparatus, while distribution is carried out.

As shown in FIG. 1, FIG. 12 and FIG. 17, the distributing attitude of the left-side distributing means 110 and the right-side distributing means 111 can be achieved by causing the rod 132 of the electrical extension and contraction drive device 130 to contract, and thus causing the distribution guide body 120 to swing towards the outer side, about the vertical axis 126. Consequently, the pin distributing face 120f on the inner side of the distribution guide section 120c assumes a position whereby it can receive the roller shaft 81 of the guide roller 82 that is guided by the start side guide section 91B on the other side.

In the swing amount controlling means 140, the stopper receiving face 120g on the outer side of the distribution guide body 120 which has been swung to the outer side, abuts against the stopper bodies 143A, 145A on the outer side of the swing amount controlling means 140. In this case, the outer stopper receiving face 120g of the distribution guide body 120 firstly abuts against the first stopper body 143A which has a soft elastic force, causes this first stopper body 143A to deform from the dotted line to the solid line in FIG. 17, and then abuts against the second stopper body 145A which has a hard elastic force.

In other words, when the roller shaft 81 of a desired guided body 80 has reached a position above the left-side distributing means 110, for example, the region of the start side guide section 91B on the other side, then on the basis of an instruction from the control section, the rod 132 is caused to contract by supplying an electrical current in the other direction (the opposite direction to that described above), to the coil of the linear motor section 131 in the electrical extension and contraction drive device 130. Thereby, as described above, the distribution guide body 120 is caused to swing towards the outer side, and hence the group of roller shafts 81 is guided from the pin distributing surface 120f on the inner side of the distribution guide body 120, to the pin guiding surface 116e in the block body 116, whereupon it is moved by being guided by the distribution director body 151 and then arrives at the region of the upper guide section 92.

In this way, by successively distributing a controlled set number of article lateral pushing bodies 70, to the left-hand side, the group of article lateral pushing bodies 70 are caused to move laterally to the main conveyance path 45, in a synchronous manner (integrated manner), while moving in the conveyance direction, each body being mutually separated by a small phase difference, and as shown in FIG. 2, the group of acting sections 79 on the other side apply a lateral pushing action to the articles 159, thereby causing the articles 159 to be distributed and moved to the left-hand side in an inclined state with respect to the main conveyance path 45, and to be transferred onto another branch conveyor 156A, without changing the orientation thereof.

The same applies to the right-side distributing means 111, wherein the acting section 79 on one side of the article lateral pushing body 70 imparts a lateral pushing action to the article 159, thereby causing the article 159 to be distributed and moved to the right-hand side, in an inclined state with respect to the main conveyance path 45, and to be transferred onto another branch conveyor 156B, without changing the orientation thereof. When an article 159 is distributed and transferred to either of the branch conveyors 156A, 156B in this way, the article 159 on the article supporting body 50 is loaded onto the upper cover 83 fixed to the upper frame body 10, and it is then transferred to a roller 157 of one of the respective branch conveyors 156A, 156B positioned in the step section 13.

The aforementioned swinging of the distribution guide body 120, in other words, the switching action, is carried out at high speed and with a shortened response time, by adopting an electrical extension and contraction drive device 130, and therefore, the system can respond satisfactorily to increased speed in the conveyance and branching operations. The controlling action provided by the swing amount controlling means 140 firstly enables the switching action to be slowed while eliminating noise (reducing noise generation), by means of the elastic deformation of the first stopper bodies 143A, 143B which have soft elastic properties, and then enables the distribution guide body 120 to be maintained in a prescribed position in the in/out direction, without causing the same to bounce, by means of the elastic deformation of the second stopper bodies 145A, 145B which have hard elastic properties. Furthermore, by adopting an electrical extension and contraction drive device 130, since the only peripheral elements are the power supply lines and the signal lines, it is possible to achieve a compact composition for the distributing means 110, 111, while also enabling smooth and reliable operation at all times, without being affected by external disturbances.

As described above, the guide roller 82 arriving at the end section of the end side guide sections 95A, 95B is reversed by being guided by the reversing guide bodies 109A, 109B, and it is then guided by the inner movement guide sections 101A, 101B and moved to the central region. Thereupon, after distribution in the left and rightward directions by means of the switching means 103, the guide roller 82 is moved towards the outer side by being guided by the outer movement guide sections 102A, 102B, and furthermore, it is reversed by being guided by the reversing guide bodies 108A, 108B, whereupon it is moved to either one of the start side guide sections 91A, 91B.

Next, a second embodiment of the present invention is described on the basis of FIG. 18 to FIG. 25.

In this second embodiment, the left-side distributing means 210 is capable of distributing and guiding a guided body 80, and another start side guide section 91B is provided in the start side region, on an upper base body 212 positioned to the right-hand side of the left-side distributing means 210, in addition to which, one block body 216 and a distribution guide body 220 are disposed respectively. More specifically, fixing through holes 213 are formed in a prescribed plurality of position in the upper base body 212, and a first coupling through hole 214 and a second coupling through hole 215 are formed in prescribed positions. The block body 216 is fixed onto the upper base body 212 by using the fixing through holes 213.

This block body 216 is formed by a long rectangular main body section 216a, a thin seating plate section 216b extending forwards from the lower portion of the front end of the main body section 216a, and a distribution director section 216c provided in an upwardly projecting fashion from the inner side section of the upper face of the main body section 216a. A plurality of fixing through holes 217 capable of connecting with the fixing through holes 213 are formed in the main body section 216a of the block body 216, and a swing support through hole 218 capable of connecting with the first coupling through hole 214 is formed in the boundary region between the main body section 216a and the seating plate section 216b.

In plan view, the distribution guide section (one example of a distribution guide body) 216c is formed with an acute-angled projecting shape towards the upstream side, and a linear pin guide face (distribution guide face) 216d is formed on the outer side face thereof, in addition to which, the inner side face is formed with a pin guide face (distribution guide face) 216e that inclines inwardly towards the downstream side. In this case, the upstream end section of the distribution director section 216c projects towards the upstream side with respect to the main body section 216a and is positioned above the through holes 218, and the upstream end section of the pin guide face 216e is formed into a curved face 216f.

The block body 216 having the foregoing composition is fixed to the upper base body 212 by connecting the fixing through holes 217 to the fixing through holes 213, and introducing coupling members (nuts, bolts, and the like) 219 to act between the fixing through holes 217, 213, in such a manner that the block body 216 is fixed in a prescribed orientation and is prevented from rotating.

The distribution guiding body 220 comprises a long rectangular main body section 220a, a cylindrical boss section 220b suspended from the lower face of the lower side of the main body section 220a, and a distribution guide section 220c provided in an upwardly projecting fashion from the inner side portion of the upper face of the main body section 220a, and it is formed in an integral fashion from resin, or the like. A coupling through hole 221 capable of coupling with the first coupling through hole 214 is formed in the boss section 220b, and a coupling hole 222 corresponding to an operating body (described hereinafter) is formed in a position above the main body section 220a. Pin distributing faces (distribution guide faces) 220d, 220e are formed respectively on the outer face and inner face of the distribution guide section 220c.

The distribution guide body 220 having the foregoing composition is coupled swingably about a first vertical axis 226 to the block body 216, by inserting the lower portion of the boss section 220b into the through hole 218, from above, aligning the coupling through hole 221 with the first coupling through hole 214, and in this state, causing a first swingable support (nut and bolt type coupling arrangement, or the like) 225 to act between the through holes 221, 214. A collar 227 which fits externally onto the first swingable support shaft 225 is provided inside the coupling through hole 221.

A step section 223 is formed in a downstream position with respect to the distribution guide section 220c, and a portion of the distribution director section 216c that projects on the upper side thereof is positioned in this step section 223. Thereby, when performing coupling as described above, the end side section of the distribution guide body 220 and the start side section of the distribution director section (one example of a distribution director body) 216c overlap in the vertical direction, in such a manner that the pin distribution face (distribution guide face) 220e of the distribution guide body 220 and the curved face (distribution guide face) 216f of the distribution director section 216c are connected in a continuous fashion.

An operating body 230 capable of swinging about a second vertical axis 236 is provided on the upper base body 212, and this operating body 230 and the distribution guide body 220 are coupled in a relatively rotatable fashion by means of a relative coupling section 240.

In other words, the operating body 230 comprises a long link-shaped main body section 230a and a cylindrical boss section 230b suspended from the lower face of the central portion of the main body section 230a, and it is formed in an integral manner from resin, or the like. A through hole 231 is formed in the boss section 230b, a long hole section 241 forming a relative coupling section 240 is formed in a front end position of the main body section 230a, and a connecting through hole 232 corresponding to a swinging device (described hereinafter) is formed between the through hole 231 and the long hole section 241. Furthermore, respective stopper receiving faces 230c, 230d are formed on the outer face and the inner face of the base end section of the main body section 230a.

The operating body 230 having the foregoing composition is coupled swingably about a second vertical axis 236, to the upper base body 212, by inserting a collar 233 having a lip on the lower end thereof, into the through hole 231 of the boss section 230b, from below, aligning the coupling through hole 234 in this collar 233 with a second coupling through hole 215, and in this state, causing a second swing support shaft (coupling arrangement such as a nut and bolt, or the like) 235 to act between the coupling through holes 234, 215.

Using the coupling hole 222 of the distribution guide body 220, the vertical pin 242 of the nut and bolt arrangement installed on the lower face of the distribution guide body 220 engages with the long hole section 241, from above. Here, the long hole section 241 is formed in the shape of the letter S, by means of an upper guide section 241a located in a position separated from the second vertical axis 236, a lower guide section 241b located in a position slightly more adjacent to the second vertical axis 236, and an inclined guide section 241c linking the respective guide sections 241a, 241b. One example of a relative coupling section 240 is constituted by these elements 241-242, and the like.

A cylinder device (one example of a swinging device) 250 coupled to the operating body 130 is provided. More specifically, a bracket 253 is provided on top of the upper base body 212, and a cylinder main body 251 is coupled swingably to this bracket 253, by means of a vertical axle 254. The free end of the piston rod 252 is connected to the operating body 230, via a connecting pin 255 which uses the connecting through hole 232 formed in the operating body 230. Thereby, the position at which the cylinder device 250 is connected to the operating body 230 is on the side of the relative coupling section 240, with respect to the second vertical axis 236. A solenoid valve device 256 for controlling the supply of oil to the cylinder device 250 is provided on the upper base body 212, in the vicinity of the cylinder device 250.

Swing amount controlling means 260 against which the operating body 230 can abut is provided on the upper base body (fixing side) 212. More specifically, a U-shaped bracket body 261 is coupled to the top of the upper base body 212 by means of a coupling member (bolt) 262, and stopper bodies 263C, 263D made of rubber (shock-absorbing material) are disposed respectively on the relative opposing faces of a pair of vertical plate sections on the bracket body 261, and are fixed thereto by fixing members 264C, 264D. The base end section of the main body section 230a of the operating body 230 is positioned between the two stopper bodies 263C, 263D, and opposes the stopper receiving faces 230c, 230d. One example of swing amount controlling means 260 is comprises these elements 261-264C, 264D, and the like.

Figure 20:
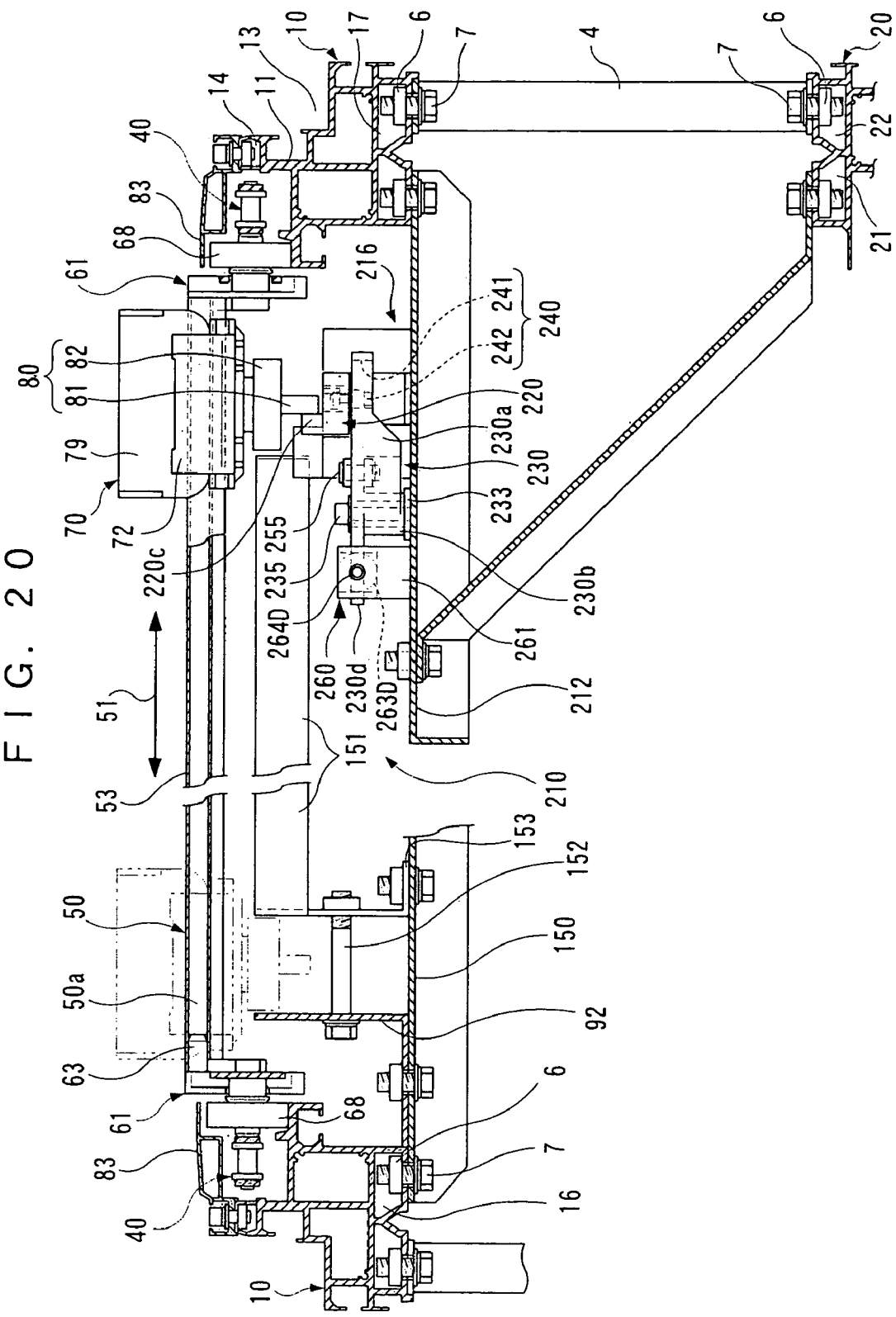
FIG. 20 is a partially cutaway front view of a principal part of the transfer apparatus.
Figure 21:
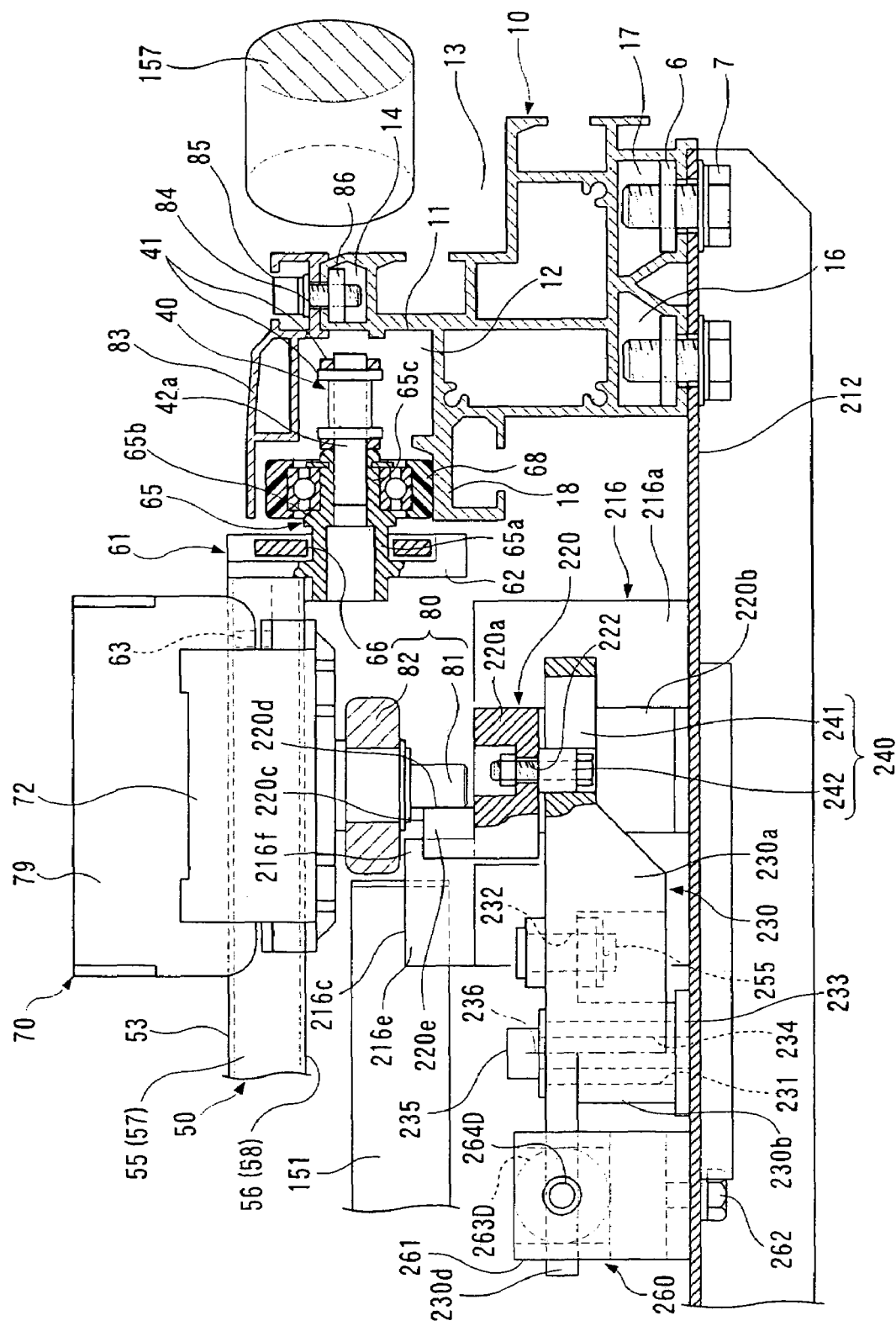
FIG. 21 is a partially cutaway front view of the left-side distributing means in the transfer apparatus.
Figure 22:
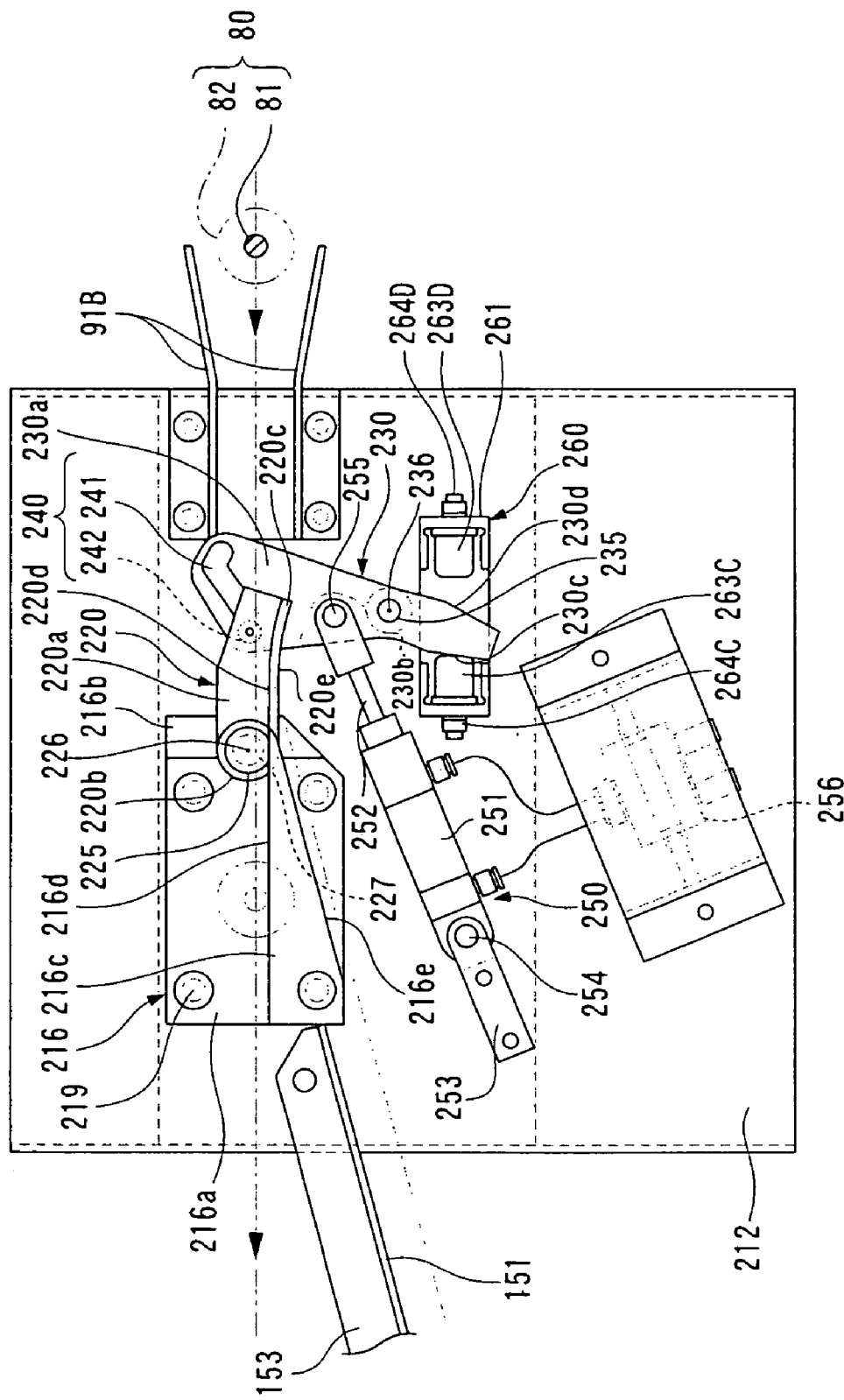
FIG. 22 is a plan view of a principal part of the left-side distributing means in the transfer apparatus, in a non-distributing attitude.

In this second embodiment, as shown in FIG. 20-FIG. 22, the non-distributing attitude of the left-side distributing means 210 and the right-side distributing means 211 is achieved by causing the cylinder device 250 to extend, thereby causing the operating body 230 to swing to the upper side about the second vertical axis 236, and thus causing the distribution guide body 220 to swing to the inner side about the first vertical axis 226, via the relative coupling section 240.

Thereby, the pin distributing face 220d on the outer side of the distribution guide section 220c assumes a position where it can receive the roller shaft 81 of a guide roller 82 guided by the start side guide section 91B on the other side. In the relative coupling section 240, the vertical pin 242 is positioned in a portion of the lower guide section 241b of the long hole section 241, and in the swing amount controlling means 260, the stopper receiving face 230c of the operating body 230 abuts against the stopper body 263C on the lower side thereof.

In a non-distributing attitude of this kind, for example, a roller shaft 81 from the start side guide section 91B on the other side is guided from the pin distributing face 220d on the outer side of the distribution guide body 220, to the pin guide face 216d on the outer side of the block body 216. Therefore, it is moved and passed straight through the section of the left-side distributing means 210, without being distributed.

Figure 18:
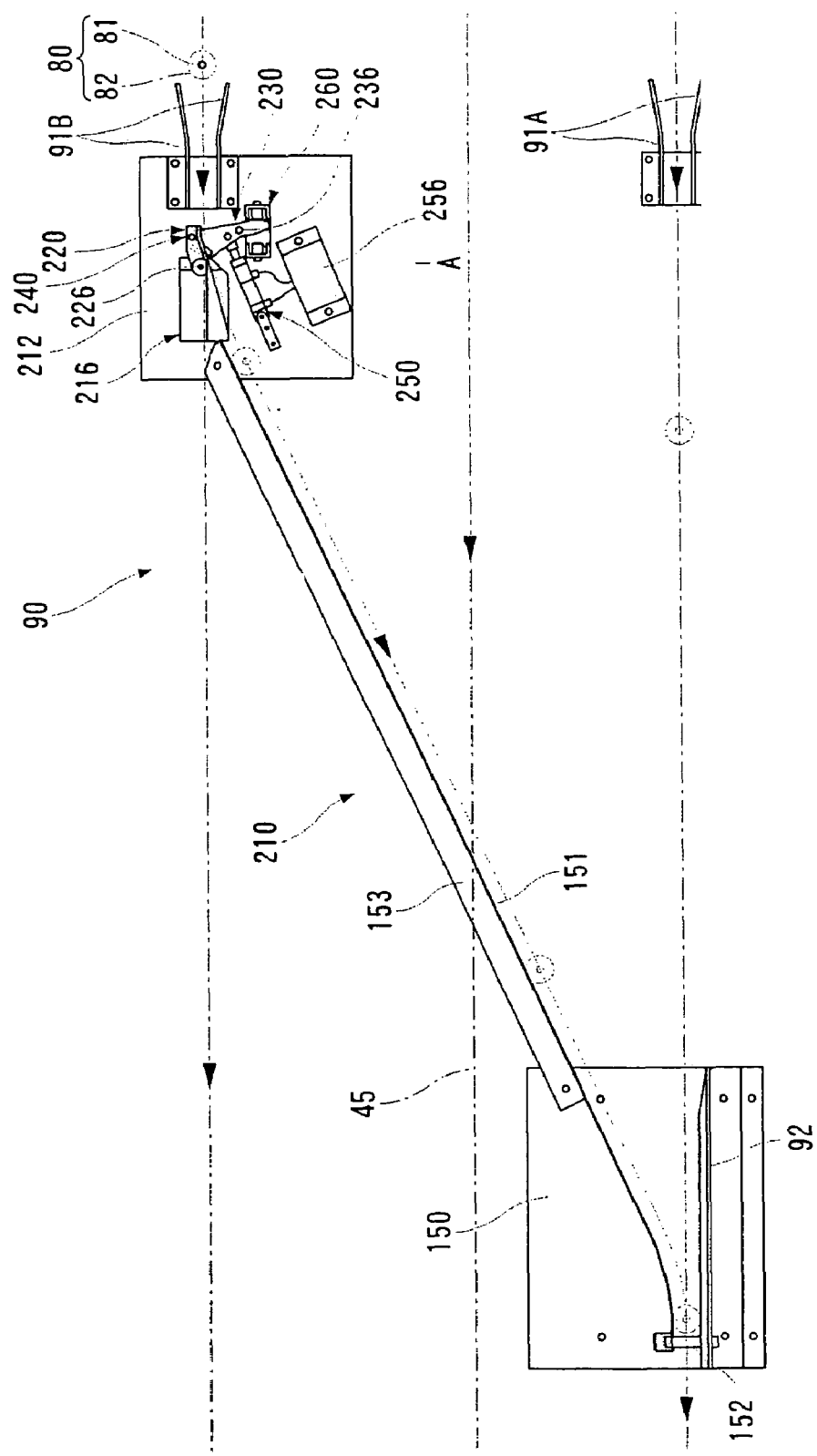
FIG. 18 is a plan view of left-side distributing means in a transfer apparatus according to a second embodiment of the present invention.
Figure 19:
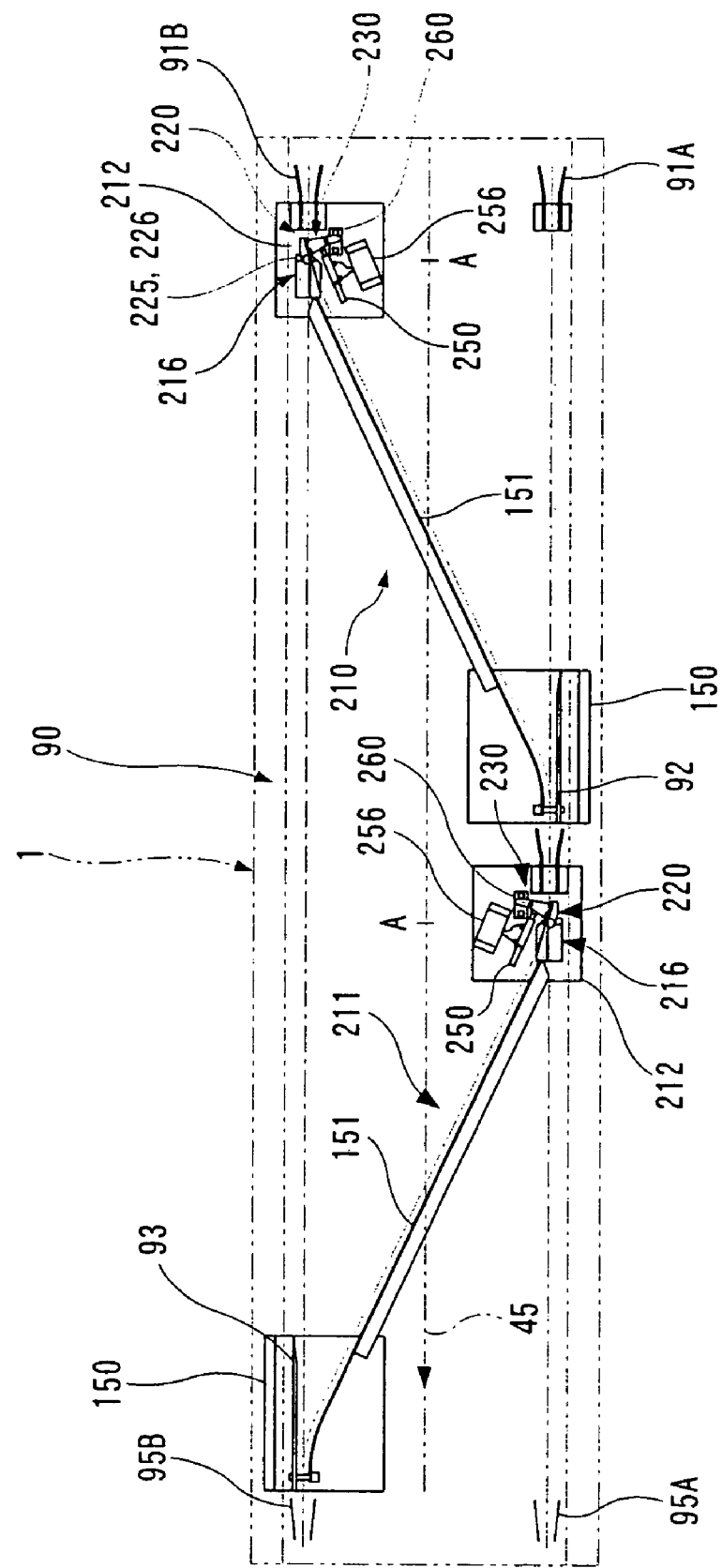
FIG. 19 is a schematic plan view showing a group of outward path guide devices in the transfer apparatus.
Figure 23:
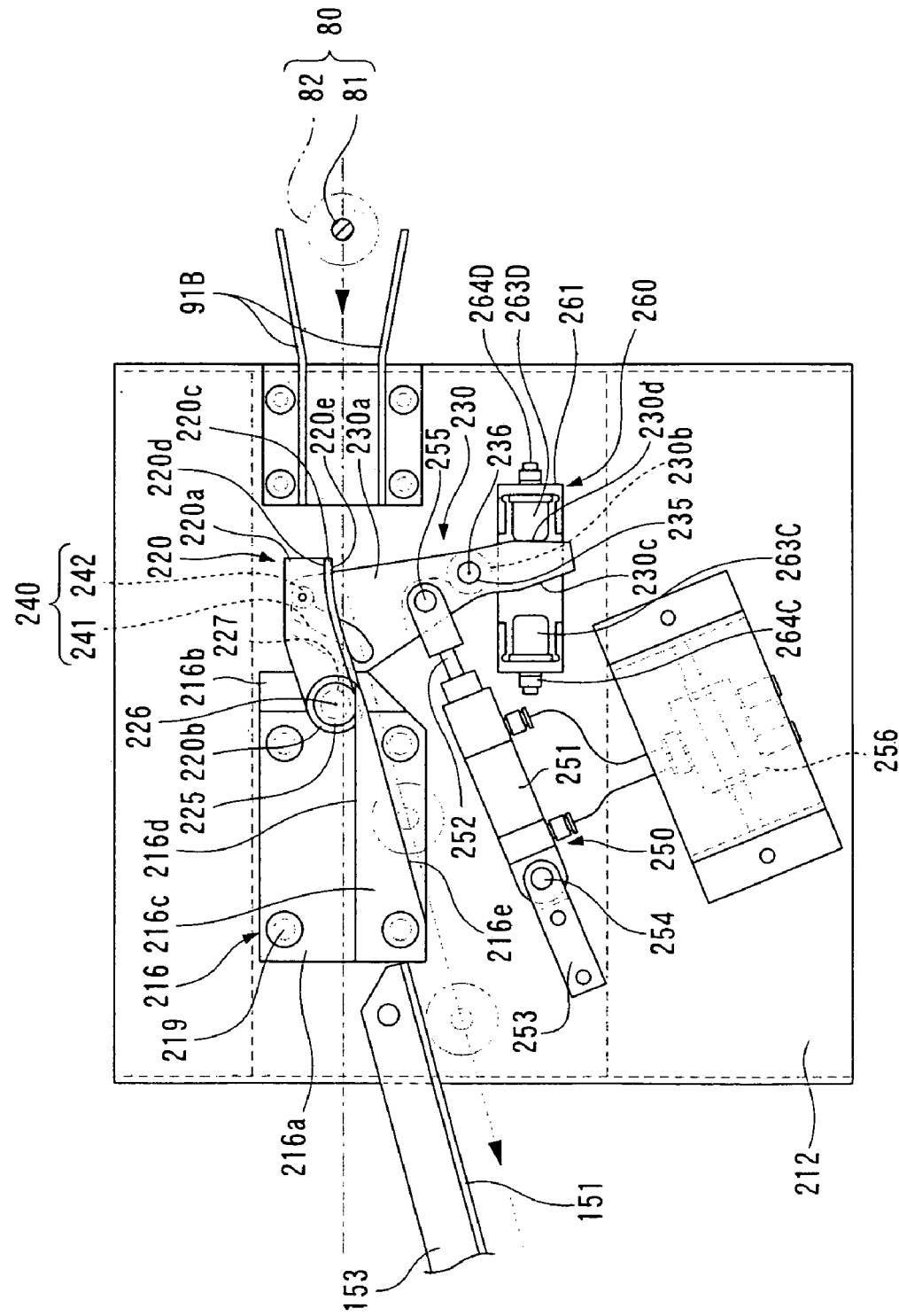
FIG. 23 is a plan view of the principal part of the left-side distributing means in the transfer apparatus, in a distributing attitude.
Figure 24:
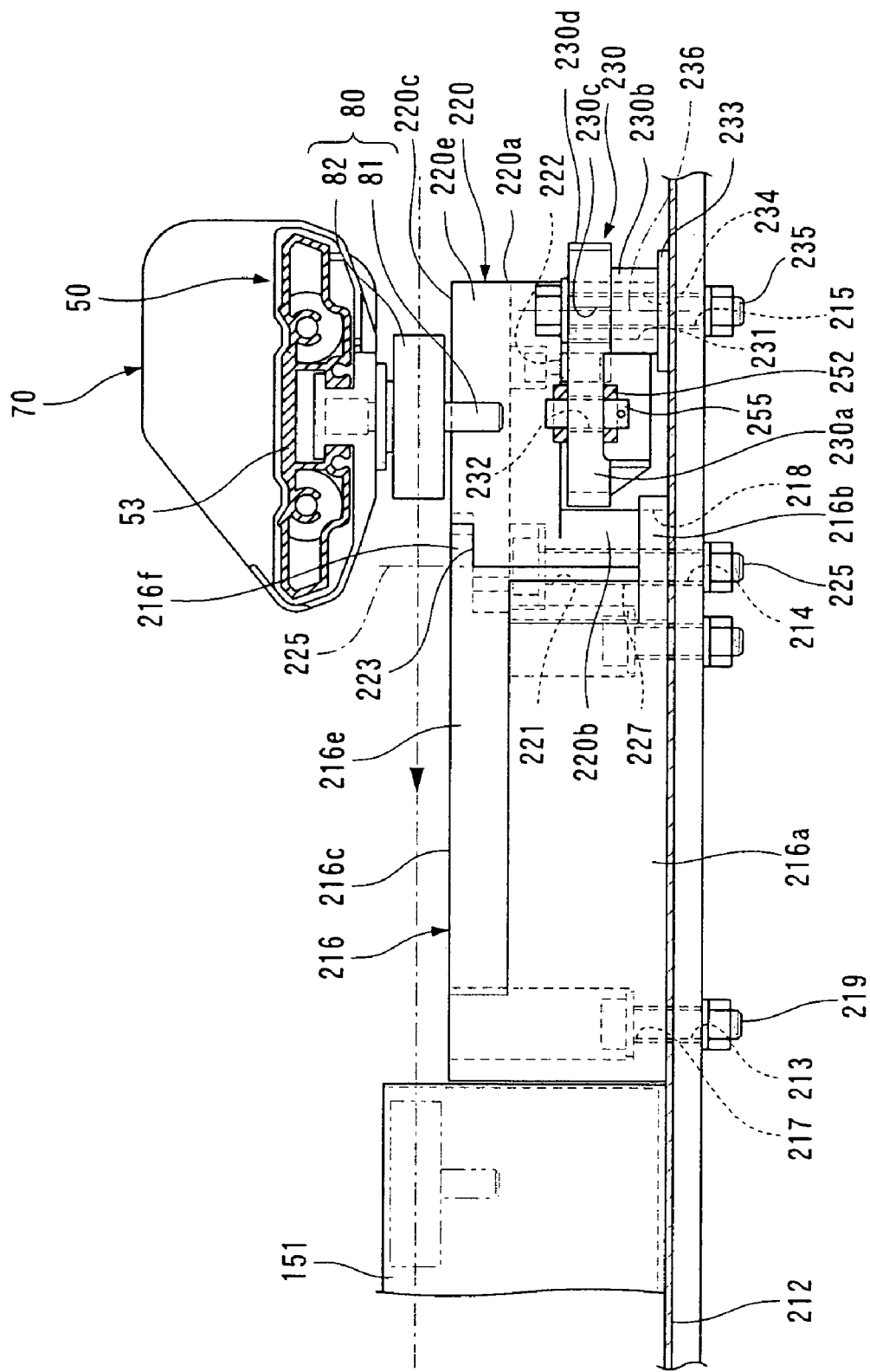
FIG. 24 is a side view of the principal part of the left-side distributing means in the transfer apparatus.
Figure 25:
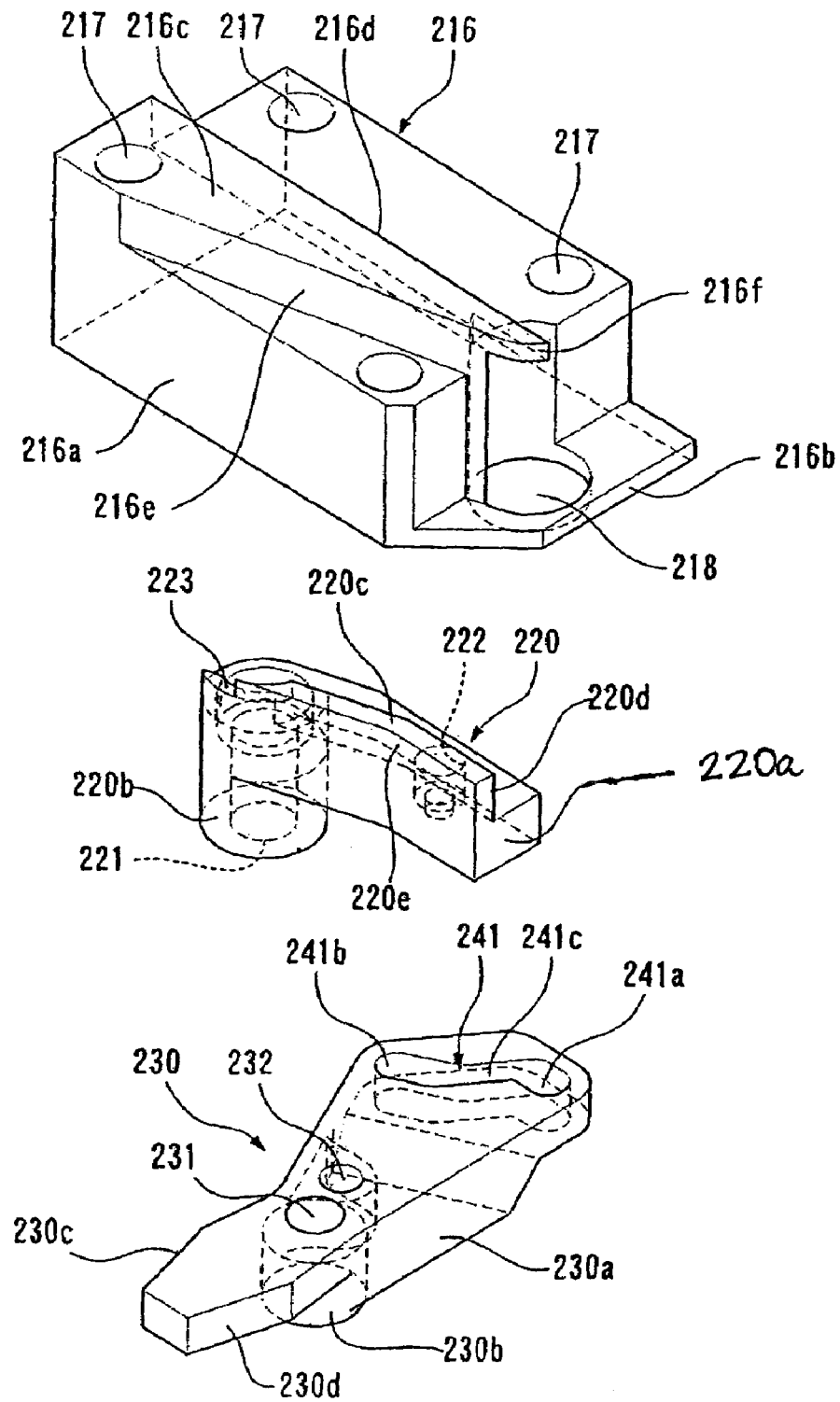
FIG. 25 is an exploded perspective view of a part of the distributing means in the transfer apparatus.

Furthermore, as illustrated by FIG. 18 and FIG. 23, the distributing attitude of the left-side distributing means 210 and the right-side distributing means 211 can be achieved by causing the cylinder device 250 to contract, thereby causing the operating body 230 to swing to the lower side about the second vertical axis 236, and thus causing the distribution guide body 220 to swing to the outer side about the first vertical axis 226, by means of the relative coupling section 240.

Thereby, the pin distributing face 220e on the inner side of the distribution guide section 220c assumes a position in which it can receive the roller shaft 81 of a guide roller 82 guided by the start side guide section 91B on the other side. In the relative coupling section 240, the vertical pin 242 is positioned in a portion of the upper guide section 241a of the long hole section 241, and in the swing amount controlling means 260, the stopper receiving face 230d of the operating body 230 abuts against the stopper body 263D on the upper side thereof.

In other words, when the roller shaft 81 of a desired guided body 80 has reached a position above the left-side distributing means 210, for example, the region of the start side guide section 91B on the other side, then on the basis of an instruction from the control section, the cylinder device 250 is caused to contract. Thereby, as described above, the distribution guide body 220 is caused to swing towards the outer side, and hence the group of roller shafts 81 is guided from the pin distributing surface 220e on the inner side of the distribution guide body 220, to the pin guiding surface 216e in the block body 216, whereupon it is moved by being guided by the distribution director body 151 and then arrives at the region of the upper guide section 92.

Figure 26:
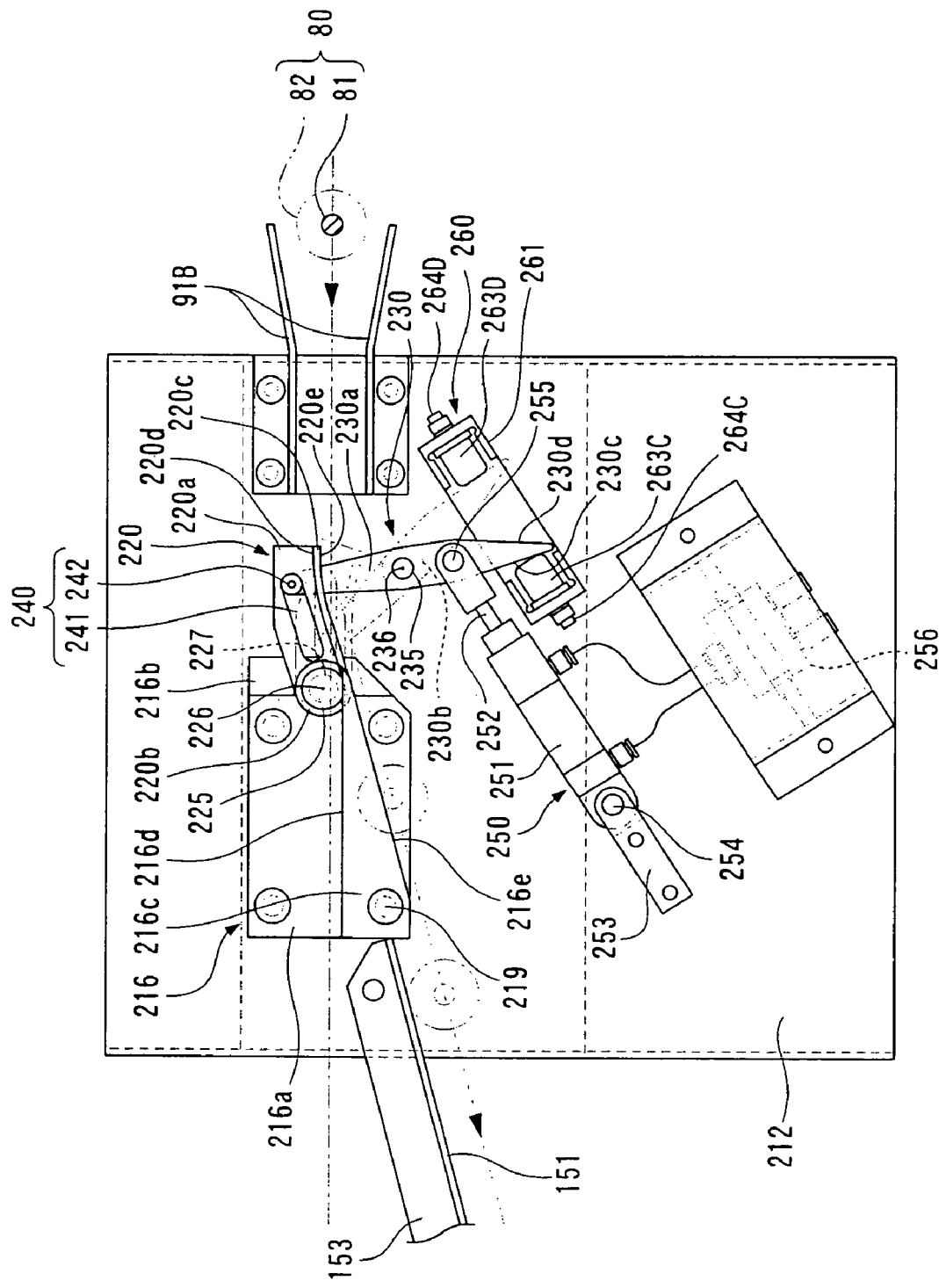
FIG. 26 is a plan view of a principal part of left-side distributing means in a transfer apparatus according to a third embodiment of the present invention.

Next, a third embodiment of the present invention is described on the basis of FIG. 26.

In the second embodiment described above, the position at which the cylinder device 250 is connected to the operating body 230 by means of the coupling pin 255 is located on the side of the relative coupling section 240 with respect to the second vertical axis 236, whereas in this third embodiment, the position at which the cylinder device 250 is connected to the operating body 230 by means of the coupling pin 255 is located on the opposite side to the relative coupling section 240, with respect to the second vertical axis 236. Furthermore, as a relative coupling section 240, in addition to forming a linearly shaped long hole section 241 in the distribution guide body 220, a vertical pin 242 which engages with the long hole section 241 is provided in the operating body 230.

According to this third embodiment, the outer shape of the distribution guide body 220 and the operating body 230 is slightly different, but the basic distributing operation is performed in the same way as that in the second embodiment described above. In other words, the solid lines in FIG. 26 show a distributing attitude, and the dotted lines in FIG. 26 show a non-distributing attitude.

Similarly to the first embodiment described above, the end side section of the distribution guide body 120 and the start side section of the distribution director section 116c overlap in the vertical direction, in such a manner that the distribution guide faces 120e, 116e of the distribution guide body 120 and the distribution director section 116c are connected, whereby the guided body 80 reaches the distribution guide face 120e at the end section of the distribution guide body 120 and the distribution guide face 116e at the start section of the distribution director section 116c, simultaneously, and hence the movement of the guided body 80 from the distribution guide body 120 to the distribution director section 116c is carried out smoothly and reliably at all times.

In the first embodiment described above, a linear motor type was adopted for the electrical contraction and extension drive device 130, but a solenoid type or the like may also be adopted for the same.

In the first and second embodiments described above, endless chains were adopted as a pair of right and left rotating bodies, and these were coupled to coupling sections 65 of the side members 61, by means of link pins 42a extending in the leftward and rightward directions, but a belt or wire, or the like, may also be adopted for the same, in which case, these elements are coupled to the coupling sections 65 of the side members 61 via suitable coupling means.

In the first and second embodiments described above, a configuration involving a direct coupling at only two points in symmetrical positions was described for the coupling between the endless chains 40 and the side members 61, but it is also possible to adopt a configuration whereby directly coupling is provided at four positions in each corner.

In the first to third embodiments described above, the guided body 80 was described as being constituted by a roller shaft 81 and a guide roller 82, but it may also be constituted by either one of the roller shaft 81 or guide roller 82 only.

In the first embodiment described above, the swing amount controlling means 140 against which the distribution guide body 120 can abut is provided on the upper base body 112, but a composition may also be adopted wherein this swing amount controlling means 140 is omitted, or the like.

In the first embodiment described above, a configuration is described wherein the controlling action of the swing amount controlling means 140 is such that, firstly, the switching action is slowed, without generating noise, by means of the elastic deformation of the first stopper bodies 143A, 143B which have soft elastic properties, whereupon the distribution guide body 120 can be maintained in a prescribed position in the inward/outward direction, without being caused to bounce, by means of the elastic deformation of the second stopper bodies 145A, 145B which have hard elastic properties, but it is also possible to adopt a configuration wherein either the stopper bodies having soft elastic properties or the stopper bodies having hard elastic properties only, are used.

In the first and second embodiments described above, a rotating body 68 guided by the guide rail sections 18, 25 is fitted externally onto the coupling section 65, but a configuration may also be adopted whereby this rotating body 68 is provided at a separate position, or the like.

In the second and third embodiments described above, a cylinder device 250 was described as a swinging device, but a screw shaft configuration or a solenoid configuration, or the like, may also be used for the same.

In the second and third embodiments described above, a composition is described wherein swing amount controlling means 260 against which the operating body 230 can abut is provided on the upper base body 212, but a composition may also be adopted wherein these swing amount controlling means 260 are omitted, or the like.

In the second and third embodiments described above, a composition is described wherein the end section of the distribution guide body 220 and the start section of the distribution director section 216c are mutually overlapping in the vertical direction, and the respective distribution guide faces 220e, 216e of the distribution guide body 220 and the distribution director section 216c are connected in a continuous fashion, but it is also possible to adopt a composition wherein the end section of the distribution guide body 220 and the start section of the distribution director section 216c are located in mutually proximate positions, but are not overlapping.

What is claimed is:

1. A transfer apparatus comprising:
a pair of right and left endless rotating bodies disposed along a main conveyance path;
article supporting bodies having a longitudinal direction which is perpendicular to the main conveyance path, and installed in plural fashion between the endless rotating bodies;
article lateral pushing bodies guided by the article supporting bodies;
guided bodies provided on rear faces of the article lateral pushing bodies;
a group of guide devices for guiding the guided bodies; and
distributing means disposed at a branching section of the group of guide devices, wherein
said distributing means comprises a distribution guide body capable of swinging about a vertical axis, and an electrical extension and contraction drive device connected to the distribution guide body,
swing amount controlling means against which the distribution guide body can abut is provided on a fixed section therefor, and
said swing amount controlling means comprises a pair of first stopper bodies having soft elastic properties, and a pair of second stopper bodies having hard elastic properties, the second stopper bodies are separated and distinct from the first stopper bodies and the first stopper bodies project inwards with respect to the second stopper bodies, the free end portion of the distribution guide body is positioned between the respective stopper bodies, the stopper bodies receiving faces are mutually opposed, and the distribution guide body abuts against a first stopper body and subsequently abuts against a second stopper body while causing the first stopper body to undergo elastic deformation.

2. The transfer apparatus according to claim 1, wherein the first stopper bodies and the hard elastic second stopper bodies are disposed respectively on a U-shaped bracket body coupled to the top of an upper base body.

3. A transfer apparatus comprising:
a pair of right and left endless rotating bodies disposed along a main conveyance path;
article supporting bodies having a longitudinal direction which is perpendicular to the main conveyance path, and installed in plural fashion between the endless rotating bodies;
article lateral pushing bodies guided by the article supporting bodies;
guided bodies provided on rear faces of the article lateral pushing bodies;
a group of guide devices for guiding the guided bodies; and
distributing means disposed at a branching section of the group of guide devices; wherein
said distributing means comprises a distribution guide body capable of swinging about a first vertical axis, and an operating body capable of swinging about a second vertical axis, the distribution guide body and the operating body being coupled in a relatively rotatable fashion by means of a relative coupling section, the operating body being connected with a swinging device,
the relative coupling section comprises an elongated slot formed in one of the distribution guide body and the operating body, and a vertical pin formed in the other thereof,
the distribution guide body comprises: a main body section including a boss section having a first vertical axis such that the distribution guide body is swingable about the first vertical axis; and a vertical pin located at an upper position of the main body section,
the operating body comprises: a main body section including a boss section having a second vertical axis such that the operating body is swingable about the second vertical axis; and an elongated slot forming a relative coupling section located at a tip end position of the main body section,
the vertical pin attached to the distribution guide body is engaged in the elongated slot of the operating body, and the operating body and the distribution guide body are coupled to each other in a relatively rotatable fashion via the relative coupling section, and
a connecting pin is provided between a though hole formed in the boss section of the operating body and the elongated slot, and a swinging device is connected to the operating body by means of the connecting pin.

4. The transfer apparatus according to claim 3, further comprising swing amount controlling means against which the operating body can abut to limit movement thereof.

5. The transfer apparatus according to claim 3, further comprising a distribution director body having a start section and a guide face along one side thereof, said distribution guide body having an end section and a guide face along one side thereof, wherein the end section of the distribution guide body and the start section of the distribution director body overlap mutually in the vertical direction, in such a manner that the distribution guide face of the distribution guide body and the distribution guide face of the distribution director body are continuously connected.

6. The transfer apparatus according to claim 3, wherein a position at which the swinging device is operatively connected to the operating body is on a side of the relative coupling section, with respect to the second vertical axis.

7. The transfer apparatus according to claim 3, wherein a position at which the swinging device is operatively connected to the operating body is on a side opposite to the relative coupling section, with respect to the second vertical axis.

8. A transfer apparatus comprising: a pair of right and left endless rotating bodies disposed along a main conveyance path;
article supporting bodies having a longitudinal direction which is perpendicular to the main conveyance path, and installed in plural fashion between the endless rotating bodies;
article lateral pushing bodies guided by the article supporting bodies;
guided bodies provided on rear faces of the article lateral pushing bodies;
a group of guide devices for guiding the guided bodies; and
distributing means disposed at a branching section of the group of guide devices; wherein
said distributing means comprises a distribution guide body capable of swinging about a first vertical axis, and an operating body capable of swinging about a second vertical axis, the distribution guide body and the operating body being coupled in a relatively rotatable fashion by means of a relative coupling section, the operating body being connected with a swinging device,
the relative coupling section comprises an elongated slot formed in one of the distribution guide body and the operating body, and a vertical pin formed in the other thereof,
the distribution guide body comprises: a main body section including a boss section having a first vertical axis such that the distribution guide body is swingable about the first vertical axis; and a vertical pin located at an upper position of the main body section,
the operating body comprises: a main body section including a boss section having a second vertical axis such that the operating body is swingable about the second vertical axis; and an elongated slot forming a relative coupling section located at a tip end position of the main body section,
the vertical pin attached to the distribution guide body is engaged in the elongated slot of the operating body, and the operating body and the distribution guide body are coupled to each other in a relatively rotatable fashion via the relative coupling section, and
a connecting pin is provided between a though hole formed in the boss section of the operating body and the elongated slot, and a swinging device is connected to the operating body by means of the connecting pin, wherein the elongated slot is formed in an S-like shape by means of an upper guide section located in a position separated from the second vertical axis, a lower guide section located in a position slightly closer to the second vertical axis, and an inclined guide section linking the upper guide section and the lower guide section.

9. A transfer apparatus comprising:
a pair of right and left endless rotating bodies disposed along a main conveyance path;

article supporting bodies having a longitudinal direction which is perpendicular to the main conveyance path, and installed in plural fashion between the endless rotating bodies;
article lateral pushing bodies guided by the article supporting bodies;
guided bodies provided on rear faces of the article lateral pushing bodies;
a group of guide devices for guiding the guided bodies; and
distributing means disposed at a branching section of the group of guide devices, wherein
said distributing means comprises a distribution guide body capable of swinging about a vertical axis, and an electrical extension and contraction drive device connected to the distribution guide body,
swing amount controlling means against which the distribution guide body can abut is provided on a fixed section therefor, and
said swing amount controlling means comprises a pair of first stopper bodies having soft elastic properties, and a pair of second stopper bodies having hard elastic properties, the first stopper bodies project inwards with respect to the second stopper bodies, the free end portion of the distribution guide body is positioned between the respective stopper bodies, the stopper bodies receiving faces are mutually opposed, and the distribution guide body abuts against a first stopper body and subsequently abuts against a second stopper body while causing the first stopper body to undergo elastic deformation, the first stopper bodies and the hard elastic second stopper bodies being disposed respectively on a U-shaped bracket body coupled to the top of an upper base body, wherein the soft elastic first stopper bodies are disposed respectively on the mutually opposing faces of a pair of vertical plate sections in the bracket body and, the hard elastic second stopper bodies are disposed respectively on a base plate section of the bracket body, below the first stopper bodies.

10. A transfer apparatus comprising:
a pair of right and left endless rotating bodies disposed along a main conveyance path;
article supporting bodies having a longitudinal direction which is perpendicular to the main conveyance path, and installed in plural fashion between the endless rotating bodies;
article lateral pushing bodies guided by the article supporting bodies;
guided bodies provided on rear faces of the article lateral pushing bodies;
a group of guide devices for guiding the guided bodies; and
distributing means disposed at a branching section of the group of guide devices, wherein
said distributing means comprises a distribution guide body capable of swinging about a vertical axis, and an electrical extension and contraction drive device connected to the distribution guide body,
swing amount controlling means against which the distribution guide body can abut is provided on a fixed section therefor, and
said swing amount controlling means comprises a pair of first stopper bodies having soft elastic properties, and a pair of second stopper bodies having hard elastic properties, the first stopper bodies project inwards with respect to the second stopper bodies, the free end portion of the distribution guide body is positioned between the respective stopper bodies, the stopper bodies receiving faces are mutually opposed, and the distribution guide body abuts against a first stopper body and subsequently abuts against a second stopper body while causing the first stopper body to undergo elastic deformation, the first stopper bodies and the hard elastic second stopper bodies being disposed respectively on a U-shaped bracket body coupled to the top of an upper base body, wherein the first stopper bodies are made of rubber and, and the second stopper bodies are made of urethane.

* * * * *